United States Patent [19]
Romesburg

[11] Patent Number: 5,796,819
[45] Date of Patent: Aug. 18, 1998

[54] ECHO CANCELLER FOR NON-LINEAR CIRCUITS

[75] Inventor: Eric Douglas Romesburg, Chapel Hill, N.C.

[73] Assignee: Ericsson Inc., Research Triangle Park, N.C.

[21] Appl. No.: 685,495

[22] Filed: Jul. 24, 1996

[51] Int. Cl.$^6$ .................................... H04M 9/00
[52] U.S. Cl. .................. 379/406; 379/410; 379/411; 381/71.11; 370/291
[58] Field of Search .................. 379/410, 411, 379/406, 402, 390, 391, 407, 408, 409, 388, 389; 364/724.19; 370/291; 381/71.4, 71.11, 73.1, 93

[56] References Cited

U.S. PATENT DOCUMENTS

| | | | |
|---|---|---|---|
| 4,468,641 | 8/1984 | Duttweiler et al. | 333/166 |
| 4,584,441 | 4/1986 | Chance et al. | 179/170.2 |
| 4,636,586 | 1/1987 | Schiff | 379/390 |
| 4,677,677 | 6/1987 | Erikson | 381/71.11 |
| 4,712,235 | 12/1987 | Jones, Jr. | 379/410 |
| 4,782,525 | 11/1988 | Sylvain et al. | 379/410 |
| 4,956,838 | 9/1990 | Gilloire et al. | 379/388 |
| 5,062,102 | 10/1991 | Taguchi | 370/32.1 |
| 5,084,865 | 1/1992 | Koike | 370/32.1 |
| 5,131,032 | 7/1992 | Esaki et al. | 379/410 |
| 5,193,112 | 3/1993 | Sano | 379/410 |
| 5,237,562 | 8/1993 | Fujii et al. | 370/32.1 |
| 5,263,019 | 11/1993 | Chu | 370/32.1 |
| 5,263,020 | 11/1993 | Yatsuzuka et al. | 370/32.1 |
| 5,271,057 | 12/1993 | Addeo et al. | 379/390 |
| 5,274,705 | 12/1993 | Younce et al. | 379/410 |
| 5,280,525 | 1/1994 | Wesel | 379/400 |
| 5,305,309 | 4/1994 | Chujo et al. | 370/32.1 |
| 5,307,405 | 4/1994 | Sih | 379/410 |
| 5,315,585 | 5/1994 | Iizuka et al. | 370/32.1 |
| 5,319,585 | 6/1994 | Amrany | 364/724.19 |
| 5,323,458 | 6/1994 | Park et al. | 379/390 |
| 5,381,473 | 1/1995 | Andrea et al. | 379/395 |
| 5,434,912 | 7/1995 | Boyer et al. | 379/406 |
| 5,475,731 | 12/1995 | Rasmusson | 379/3 |
| 5,513,265 | 4/1996 | Hirano | 379/410 |
| 5,553,014 | 9/1996 | Nowak et al. | 364/724.19 |
| 5,559,881 | 9/1996 | Sih | 379/410 |
| 5,602,765 | 2/1997 | Tanaka et al. | 364/724.19 |
| 5,602,929 | 2/1997 | Popovich | 364/724.19 |
| 5,631,899 | 5/1997 | Duttweiler | 379/411 |
| 5,646,991 | 7/1997 | Sih | 379/410 |
| 5,677,951 | 10/1997 | Gay | 379/410 |

FOREIGN PATENT DOCUMENTS

| | | |
|---|---|---|
| 0 366 584 A2 | 5/1990 | European Pat. Off. |
| 0 413 641 A1 | 2/1991 | European Pat. Off. |
| 0 709 958 A1 | 5/1996 | European Pat. Off. |
| 0 729 288 A2 | 8/1996 | European Pat. Off. |
| 01-64-27325 | 1/1989 | Japan. |
| 08331020 | 12/1996 | Japan. |
| 2011230 | 7/1979 | United Kingdom. |
| WO 92/19048 | 10/1992 | WIPO. |

OTHER PUBLICATIONS

Kuo, Sen M., Huang, Yu C., and Pan, Zhibing. "Acoustic Noise and Echo Cancellation Microphone System for Desktop Conferencing". The Proceedings of the 6th International Conference on Signal Processing Applications and Technology (ICSPAT), pp. 41–45 (Oct. 1995).

*Primary Examiner*—Harry S. Hong
*Assistant Examiner*—Jacques Saint-Surin
*Attorney, Agent, or Firm*—Robert A. Samra

[57] ABSTRACT

A system and a method for echo suppression which use two or more microphones for beamforming of an echo signal corresponding to an incoming speech signal that is output by a loudspeaker. The outputs of the microphones are appropriately filtered and then linearly combined to cancel the echo signal, even if the incoming speech signal has been non-linearly distorted. Also, the microphones may be selectively positioned or pointed to allow the linear cancellation of ambient noise.

68 Claims, 9 Drawing Sheets

ECHO CANCELLER FOR NON-LINEAR CIRCUITS

BACKGROUND OF THE INVENTION

1. Field of the Invention

The present invention relates to echo cancellation in communication systems and, more particularly and by way of example, to the cancellation of echoes in mobile stations equipped for hands-free operation.

2. Related Art

In communication systems providing for bidirectional (two-way) speech transmission over a communications link between two users, such as in landline and wireless telephone systems, the acoustic signal from the local user is usually detected by a microphone at the near end of the communications link and then transmitted over the communications link to the far end where it is reproduced in a loudspeaker at the far end for presentation to the remote user. Conversely, the acoustic signal from the remote user is detected by a microphone at the far end of the communications link and then transmitted over the communications link to the near end where it is reproduced in a loudspeaker at the near end for presentation to the local user. At either end of the communications link, the original speech signal transmitted from the other end and reproduced by the loudspeaker at this end may be reflected by, or may propagate through, the surroundings and be detected by the microphone at this end. This loudspeaker signal, therefore, will be transmitted back to the user at the other end and will arrive delayed in time relative to the original speech signal (the amount of delay being equal to the time required for the original speech signal to make the "round trip"). This time-delayed signal may produce an annoying "echo" which can be heard by the user at the other end.

As well known in the art, the perceptibility (severity) of the echo signal which is returned, for example, from the near end to the far end of the communications link is a function of two factors: first, the amplitude (volume or loudness) of the echo signal transmitted from the near end to the far end and, second, the amount of the delay in the echo signal received at the far end relative to the original speech signal transmitted from the far end to the near end. In general, an increase in either the amplitude or the delay of the received echo signal results in an increase in its perceptibility. The amplitude of the echo signal received at the far end, in turn, depends on the sensitivity of the microphone at the near end to the local loudspeaker signal which forms the echo signal. The delay of the echo signal, on the other hand, depends on the communication medium (e.g., wireline or wireless, analog or digital, etc.). These two aspects (amplitude and delay) of the echo signal are described further below.

In conventional handsets for wireline telephones, for example, the microphone is designed to be situated close to the user's mouth while the loudspeaker is designed to be essentially covered by the user's ear. In this arrangement, there is no need for significant gain (amplification) in the microphone in order to adequately pick up the near-end speech signal and, thus, the microphone is not very sensitive to the local loudspeaker signal. On the other hand, the continuing reduction in the size of portable telephones and the increasing use of speakerphones has meant that the microphone is farther away from the user's mouth and, therefore, must have a relatively high gain in order to preserve the desired level of the near-end speech signal. However, this also means that the microphone is more sensitive to picking up the local loudspeaker signal. The situation is even more pronounced for hands-free accessories used with vehicular telephones where the microphone may be even farther away from the user's mouth and, therefore, its gain must be even higher, which also means that it may be highly sensitive to picking up the local loudspeaker signal. In sum, the volume of the echo signals produced by modem telephones is likely to be perceptually significant.

The delay associated with the echo signal also may be perceptually significant. For a given echo volume, perceptibility increases in proportion to an increase in echo delay up to 50 ms. In general, an echo delay of more than 50 ms is considered to be perceptually intolerable. The echo signals produced by the original analog telephones in the wireline network encountered either relatively short delays (i.e., less than 50 ms) and, thus, were not perceptually significant, or to the extent they were perceptually significant, they experienced only linear distortion and, therefore, could be effectively cancelled within the network. However, the newer digital telephones, including digital cordless and cellular telephones, process the speech signals through vocoders which introduce not only significant delays (e.g., in the order of 200 ms), but also non-linear distortion which prevents effective cancellation of the echo signals in the network. For these modern telephones, the echo signal must be cancelled at the source, that is, before transmission.

To avoid the transmission of undesirable echo signals, it is necessary to isolate the near-end user signal which is input to the microphone from the far-end user signal which is generated by the loudspeaker, but which also may be detected by the microphone, and to transmit to the far-end user only the near-end user signal so that the far-end user will not hear a delayed version of his own speech. This generally has been accomplished through a process of echo suppression or echo cancellation which is designed to remove the echo signal from the output of the microphone thus leaving only the user signal for transmission (for purposes of this specification, the terms "echo suppression" and "echo cancellation" are used interchangeably to refer to the function of eliminating or reducing echo signals).

While the need for echo cancellation is present at least to some extent in all telephone systems, including those which use conventional landline telephone handsets, as mentioned above, it is particularly acute in hands-free speakerphone applications, and especially severe for vehicle-mounted or vehicle-supported (i.e., portable) radio telephones adapted for hands-free operation. The closed vehicular environment is quite susceptible to multiple reflections of the loudspeaker signal into the high-gain microphone that is used for the hands-free operation. However, the task of echo cancellation in this environment is complicated by the movement of the vehicle and by changes in the relative direction and strength of the user and echo signals as windows are opened or closed or as the user moves his head while driving. Furthermore, modem digital radio telephones include non-linear components (e.g., vocoders) which introduce non-linear distortion into the echo signal making it more difficult to remove by simple echo cancellation techniques.

Prior attempts at echo cancellation generally, and in the mobile radio telephone environment specifically, may be seen, for example, in U.S. Pat. Nos. 4,468,641; 4,584,441; 4,712,235; 5,062,102; 5,084,865; 5,305,309; 5,307,405; 5,131,032; 5,193,112; 5,237,562; 5,263,019; 5,263,020; 5,274,705; 5,280,525; 5,315,585; 5,319,585; and 5,475,731. However, a common approach to the problem of echo cancellation in the digital radio telephone environment can be seen in the circuit shown in FIG. 1. This echo cancellation circuit connects to a phone system such as a digital cellular phone (not shown). The incoming signal L from the phone system is received on line 10 of the circuit. The signal L is a pulse code modulated (PCM) or other digital representation of the speech signal originating from a far-end talker (not shown). This digital signal is applied to a series combination of a digital-to-analog converter (DAC) 16, an amplifier 18 and a loudspeaker 20, where it is converted from digital to analog, amplified and converted from an electrical signal to an acoustic (audio) signal, respectively.

With continuing reference to the echo cancellation circuit of FIG. 1, each of the DAC 16, the amplifier 18 and the loudspeaker 20 may introduce at least some (non-linear) distortion to the incoming signal L. Consequently, the output of the loudspeaker 20 is not a true replica but rather a distorted version L' of the incoming signal L. The audio signal L' will propagate through the surrounding area, reflecting off one or more surfaces and changing in direction, amplitude, frequency and/or phase before being detected by a microphone 22, which is actually intended to detect the outgoing signal T from a near-end talker 4. As well known in the art, the multi-path and frequency-dependent amplitude and phase changes and delays experienced by the signal L' as it travels from the loudspeaker 20 to the microphone 22 can be described by a single linear acoustic transfer function, here designated as $H_1$. Similarly, another acoustic transfer function, here designated as $H_3$, can be defined for the resultant path of the speech signal T from the talker 4 to the microphone 22.

Referring still to FIG. 1, the microphone 22, which includes or is connected to an amplifier and an analog-to-digital converter (both of which are not shown in FIG. 1 for the sake of simplicity), converts the acoustic echo and talker audio signals into digital electrical signals. The output of the microphone 22 is a composite signal $M_1 = L' \cdot H_1 + T \cdot H_3$ (where the symbol "·" designates multiplication or convolution of these signals in the frequency or time domain, respectively). The signal $M_1$ is fed to an input of an adder (or, equivalently, a subtractor) 24. The other input to the adder 24 receives the output of an adaptive FIR filter 14 that is used to model or estimate the transfer function $H_1$ through a set of filter tap coefficients as disclosed, for example, in U.S. Pat. No. 5,475,731. The input to the filter 14 is the incoming signal L (prior to digital-to-analog conversion in the DAC 16) and, hence, the output of the filter 14 is $L \cdot H_1$, which presumably approximates the echo signal $L'H_1$. It is assumed that the filter 14 can compensate for or match the delay of the signal L through the DAC 16, the amplifier 18, the loudspeaker 20, the acoustic path $H_1$ and the microphone 22 so that the output of the filter 14 is time aligned with the signal $M_1$. Thus, by subtracting in the adder 24 the output of the filter 14 from the signal $M_1$, the (acoustic) echo signal $L' \cdot H_1$ in $M_1$ effectively should be cancelled by the (electrical) echo estimate $L \cdot H_1$, leaving only the desired talker signal $T \cdot H_3$ for transmission on line 12 to the phone system, where it can be further processed and transmitted to the far-end talker.

It will be appreciated that the transfer function provided by the filter 14 is an estimate and not an exact replica of $H_1$ and, furthermore, $H_1$ is a dynamic function which is affected by changes in the vehicular environment (e.g., windows opening or closing). If such changes occur while the incoming signal L is active, the output of the filter 14 may deviate from the true echo estimate and, hence, there will be a residual echo signal $E_1$ on line 12. Of course, if the talker T is speaking, the signal $E_1$ will also include the speech signal $T \cdot H_3$. However, it is assumed that the echo and speech signals are relatively uncorrelated so that the signal $E_1$ can be used as an error feedback signal for adaptively adjusting the coefficients of the filter 14 so as to minimize the signal $E_1$. The Least Mean Squares (LMS) algorithm is a well known technique which can be used for this purpose.

Inherent to the prior art echo cancellation circuit of FIG. 1 is the assumption that the echo signal L', which is output from the loudspeaker 20, is substantially equal to the incoming signal L, which is input to the filter 14. In other words, echo cancellation according to the circuit of FIG. 1 requires that the distortion introduced to the signal L by the DAC 16, amplifier 18 and loudspeaker 20 is relatively negligible. If this is true, then so long as the transfer function $H_1$ for the signal L' can be substantially replicated in the filter 14, the echo signal $L' \cdot H_1$ can be effectively removed from the outgoing signal $M_1 = L' \cdot H_1 + T \cdot H_3$ by subtracting from $M_1$ the output $L \cdot H_1$ of the filter 14. Thus, when the near-end talker is silent, the error signal $E_1$, under these ideal conditions, would be zero.

However, the built-in assumption regarding the negligible effect of signal distortion (i.e., $L' \cdot H_1 = L \cdot H_1$) in the circuit of FIG. 1 does not hold true in many "real-world" applications. In practice, significant distortion may be added to the incoming signal L in one or more of the DAC 16, amplifier 18 and loudspeaker 20. In such instances, the transfer characteristics of the adaptive filter 14 would limit the subtractive cancellation at the adder 24 to only those components of the signal L which have not been distorted, thus leaving a significant residual echo signal $E_1 = L' \cdot H_1 - L \cdot H_1$ on line 12, which can be heard by the far-end talker. In other words, because the signals L and L' are not linearly related, the signal $E_1$ will contain non-linear distortion which will be transmitted to the far-end talker.

In many practical applications, significant distortion is added in the loudspeaker 20. Typical loudspeakers in handsfree accessories used with cellular telephones, for example, introduce an amplitude distortion of about 10% due to a resonance in the passband. Moreover, the gain of the signal through the loudspeaker and the microphone may be as high as 12 dB. This limits echo suppression with the circuit of FIG. 1 to about 20−12=8 dB, which is far short of the minimum industry requirement of 45 dB. Even where a more-expensive (higher-quality), "linear" (dynamic) loudspeaker with little or no passband resonance is used, there still would be about 1% distortion, and the loudspeaker alone would limit echo suppression to about 28 dB. Of course, the other components (DAC and amplifier) would add yet more distortion thereby causing the performance of the echo suppression circuit of FIG. 1 to depart even further from the accepted industry standard. In sum, for many practical applications, the idealized circuit of FIG. 1 does not meet minimum industry standards or user requirements.

Recognizing the limitations of the echo cancellation circuit of FIG. 1, the prior art has attempted to overcome those limitations by using lower distortion components such as dynamic loudspeakers, or by adding other components for removing or blocking the residual echo signal on line 12, such as center clippers, adaptive attenuators, spectral subtractors, voice detectors, double-talk detectors, divergence detectors, or noise analysis detectors. However, lower distortion components are expensive and, as mentioned above, do not completely eliminate distortion or significantly improve overall performance. Furthermore, some of the additional components actually add their own distortion, and others may actually interfere with the proper operation of the circuit. Voice detectors, for example, are often fooled by ambient noise resulting in the inadvertent removal of speech signals instead of echo signals. Similar disadvantages are also encountered with the use of other types of detectors.

Related to the problem of echo cancellation in a hands-free telephone system is the problem of acoustic noise cancellation, that is, the removal of ambient (background) noise from the talker signal being transmitted. One recent approach to the cancellation of both noise and echo is disclosed in Kuo et al., "Acoustic Noise and Echo Cancellation Microphone System for Desktop Conferencing," The Proceedings of the 6th International Conference on Signal Processing Applications and Technology (ICSPAT), Oct. 24–26, 1995, pp. 41–45. As shown in FIG. 2, this approach uses two directional microphones 22 and 26 positioned close to each other but pointed in opposite directions. The first microphone 22 points to the near-end talker 4 and is used as the primary microphone. The second microphone 26 points away from the near-end talker 4 and is used as a reference microphone for cancelling an ambient noise signal N from a noise source 8. An acoustic barrier (not shown) is placed between the microphones 22 and 26 to reduce leakage of the talker signal T into the reference microphone 26.

With continuing reference to the noise and echo cancellation circuit of FIG. 2, while this circuit is in idle mode, there will be no near-end or far-end talker signal, and the outputs $M_p$ and $M_r$ of the primary and reference microphones 22 and 26, respectively, will contain only background noise N from the noise source 8. The noise signal $M_p$ from the primary microphone 22 is supplied to an adder 27. The noise signal $M_r$ from the reference microphone 26 is fed to an adaptive filter 28 having a transfer function A(z). The output of the adaptive filter 28 is subtracted from the noise signal $M_p$ in the adder 27. During idle mode, the adaptive filter 28 adjusts its coefficients using the LMS algorithm so as to minimize the error signal $E_a$ at the output of the adder 27 and, thus, to cancel the noise signal $M_p$ from the primary microphone 22. The adaptive filter 28 will eventually converge to an optimum transfer function A*(z) which minimizes the residual noise $E_a$.

When the circuit of FIG. 2 is in receive mode, and in addition to the background noise N from the noise source 8, there will be an echo signal L' from the loudspeaker 20. A fixed optimal filter A*(z), whose coefficients were obtained from the previous idle mode, is used in place of the adaptive filter 28 to cancel the noise component in the primary signal $M_p$. The echo component of the signal $M_p$ is cancelled in an adder 29 which receives the output of an adaptive filter 30 having a transfer function B(z). The adaptive filter 30 adjusts its coefficients and performs acoustic echo cancellation using the LMS algorithm so as to minimize the residual error signal $E_b$ at the output of the adder 29. The adaptive filter 30 will eventually converge to an optimum transfer function B*(z) which minimizes the residual echo $E_b$.

When the circuit of FIG. 2 is in transmit mode, and in addition to the background noise N from the noise source 8, there will be a speech signal T from the near-end talker 4 (but presumably no echo signal). The fixed optimal filter A*(z), but not the filter B*(z), is again used to cancel the noise component in the primary signal $M_p$. In this mode, it is assumed that, because of the positioning of the microphones 22 and 26, and their separation with an acoustic barrier, there will be little leakage of the speech signal T into the reference microphone 26. Thus, it is assumed that the near-end talker signal T will be detected by the primary microphone 22 and transmitted with minimal distortion to the far-end talker.

When the circuit of FIG. 2 is operating in "double-talk" (transmit and receive) mode, the reference signal $M_r$ will contain background noise N from the noise source 8, an echo signal L' from the loudspeaker 20 and a (presumably minimal) speech signal T from the talker 4. In this mode, the fixed optimal filters A*(z) and B*(z) from the previous idle and receive modes, respectively, are used to cancel the noise and echo components, respectively, in the primary signal $M_p$.

The circuit of FIG. 2 is designed to allow the use of two low order filters for noise and echo cancellation. Because the primary and reference microphones 22 and 26 are closely placed, their outputs $M_p$ and $M_r$, respectively, will contain highly correlated acoustic noise and echo signals that can be cancelled with the two low order filters 28 and 30, respectively. However, this design requires the use of robust voice detectors to differentiate between speech and noise in the idle, receive, transmit and double-talk modes. In a noisy environment, such as the vehicular telephone environment, such detectors could be easily fooled by noise, especially during mobile-to-mobile calls. Furthermore, the design of the circuit of FIG. 2 requires that the filters 28 and 30 be activated and deactivated during operation in the different modes, thus resulting in annoying transitions which can be heard by the far end user.

In view of the shortcomings of the above approaches to echo and/or noise cancellation, there is a need for a new echo cancellation circuit which can effectively remove echo signals in the presence of non-linear distortion, and which does not require the use of expensive components or additional detectors. It is also desired that this new circuit be able to effectively cancel echo even in a noisy or changing environment. In addition, it is desirable that this new circuit be able to effectively cancel background noise. These objectives are fulfilled by the present invention.

SUMMARY OF THE INVENTION

The present invention provides the desired level of echo suppression without the expense of high quality audio components, such as the linear loudspeakers which would be required in the circuit of FIG. 1, and without the need for using detector circuits, such as the voice detectors which would be required in the circuit of FIG. 2, with their attendant problems. In general, echo suppression in accordance with the present invention is achieved by (1) using the distorted signal $E_1$ in the one-microphone circuit of FIG. 1 not as the output of the echo cancellation circuit, but only as an error signal for an adaptive filter which estimates a desired acoustic transfer function, (2) using at least one other microphone and at least one other adaptive filter which estimates another desired acoustic transfer function, as in the two-microphone circuit of FIG. 2, while also avoiding the use of voice detectors by using the incoming signal L as a reference signal for adjusting the coefficients of at least one of the adaptive filters, (3) filtering the distorted echo signal outputs of one or more of the microphones (which themselves add virtually no distortion) using the coefficients of one or more of the adaptive filters, and (4) linearly combining the filtered and/or unfiltered outputs of the microphones to eliminate the non-linearly-distorted echo signal. In this manner, the distorted acoustic echo signal detected by one microphone can be essentially cancelled by the distorted acoustic echo signal detected by another microphone instead of being only partially cancelled by an electrical echo estimate based on the undistorted echo signal, as is the case, for example, in the prior art circuit of FIG. 1.

In the various embodiments of the circuit of the present invention, the desired filtering of any microphone output may be performed in a fixed filter whose coefficients are copied from one or more of the adaptive filters, in an adaptive filter whose coefficients are adjusted with reference to the incoming signal L, or in an adaptive filter which uses the output of another adaptive filter as a reference signal. Furthermore, in these embodiments, ambient noise also may be automatically cancelled, along with the cancellation of the echo signal, by appropriate positioning or pointing of the microphones of the present invention. Unlike the prior art, this new and linear approach to echo and noise cancellation is indifferent as to which of the near-end and far-end talkers is active at any time and, furthermore, it cannot be "fooled" by noise, and does not itself insert any non-linear distortion products.

In one aspect, the present invention provides a method of echo cancellation in an audio circuit comprising a microphone and a loudspeaker, the microphone detecting a speech signal from a near-end user, the loudspeaker receiving a far-end speech signal and generating a corresponding echo signal that is also detected by the microphone. The method comprises the steps of providing at least one other microphone in the audio circuit for detecting the echo signal, the at least one other microphone also detecting the near-end speech signal; estimating a plurality of acoustic transfer functions in a plurality of adaptive filters each having a plurality of coefficients, at least one of the adaptive filters using the far-end speech signal as a reference signal for adapting its coefficients; filtering the outputs of one or more of the microphones using the coefficients of one or more of the adaptive filters; and combining the filtered and/or unfiltered microphone outputs so as to substantially cancel the echo signal while substantially preserving the near-end speech signal.

Several embodiments of this method are possible where the audio circuit includes first and second microphones, and where the echo signal from the loudspeaker to the first and second microphones is characterized by acoustic transfer functions $H_1$ and $H_2$, respectively. Similarly, several embodiments of this method are possible where the audio circuit includes first, second and third microphones, and where the echo signal from the loudspeaker to the first, second and third microphones is characterized by acoustic transfer functions $H_1$, $H_2$ and $H_5$, respectively. A number of exemplary embodiments is described herein for each of the two-microphone and three-microphone circuits. Of course, many other embodiments are contemplated by the present invention, including those for more-than-three microphone circuits.

In a first exemplary embodiment of the inventive method for the two-microphone circuit, the method comprises the steps of estimating $H_1$ in a first adaptive filter using the far-end speech signal as a reference signal for adapting the coefficients of the first adaptive filter; estimating $H_2$ in a second adaptive filter using the far-end speech signal as a reference signal for adapting the coefficients of the second adaptive filter; filtering the output of the first microphone in a first fixed filter using the coefficients of the second adaptive filter; filtering the output of the second microphone in a second fixed filter using the coefficients of the first adaptive filter; and subtracting the output of the second fixed filter from the output of the first fixed filter.

In a second exemplary embodiment for the two-microphone circuit, the method comprises the steps of estimating $H_1$ in a first adaptive filter using the far-end speech signal as a reference signal for adapting the coefficients of the first adaptive filter; estimating $H_2$ in a second adaptive filter using the far-end speech signal as a reference signal for adapting the coefficients of the second adaptive filter; filtering the output of the second microphone in a fixed filter which estimates $H_1/H_2$ using the coefficients of the first and second adaptive filters; and subtracting the output of the fixed filter from the output of the first microphone.

In a third exemplary embodiment for the two-microphone circuit, the method comprises the steps of estimating $1/H_1$ in a first adaptive filter using the far-end speech signal as a reference signal for adapting the coefficients of the first adaptive filter; estimating $1/H_2$ in a second adaptive filter using the far-end speech signal as a reference signal for adapting the coefficients of the second adaptive filter; filtering the output of the first microphone in the first adaptive filter; filtering the output of the second microphone in the second adaptive filter; and subtracting the output of the second adaptive filter from the output of the first adaptive filter.

In a fourth exemplary embodiment for the two-microphone circuit, the method comprises the steps of estimating $H_1$ in a first adaptive filter using the far-end speech signal as a reference signal for adapting the coefficients of the first adaptive filter; estimating $1/H_2$ in a second adaptive filter using the far-end speech signal as a reference signal for adapting the coefficients of the second adaptive filter; filtering the output of the second microphone in the second adaptive filter; filtering the output of the second adaptive filter in a fixed filter using the coefficients of the first adaptive filter; and subtracting the output of the fixed filter from the output of the first microphone.

In a fifth exemplary embodiment for the two-microphone circuit, the method comprises the steps of estimating $H_1$ in a first adaptive filter using the far-end speech signal as a reference signal for adapting the coefficients of the first adaptive filter; estimating $H_1/H_2$ in a second adaptive filter using the output of the first adaptive filter as a reference signal for adapting the coefficients of the second adaptive filter; filtering the output of the second microphone in the second adaptive filter; and subtracting the output of the second adaptive filter from the output of the first microphone.

In any of these exemplary embodiments for the two-microphone circuit, the first and second microphones may be positioned relative to the user and the loudspeaker such that the first microphone receives a substantially higher level of the near-end speech signal than the second microphone and the second microphone receives a substantially higher level of the echo signal than the first microphone. Alternatively, the first and second microphones may be positioned substantially equidistant from the loudspeaker so as to also suppress ambient noise which is substantially equally received by the first and second microphones.

In a first exemplary embodiment for the three-microphone circuit, the method comprises the steps of estimating $H_1$ in a first adaptive filter using the far-end speech signal as a reference signal for adapting the coefficients of the first adaptive filter; estimating $H_2$ in a second adaptive filter using the far-end speech signal as a reference signal for adapting the coefficients of the second adaptive filter; estimating $H_5$ in a third adaptive filter using the far-end speech signal as a reference signal for adapting the coefficients of the third adaptive filter; filtering the output of the first microphone in a first pair of fixed filters using the coefficients of the second and third adaptive filters, respectively; filtering the output of the second microphone in a second pair of fixed filters using the coefficients of the first and third adaptive filters, respectively; filtering the output of the third microphone in a third pair of fixed filters using the coefficients of the first and second adaptive filters, respectively; multiplying the output of the first pair of fixed filters by a constant (c) in a first multiplier, where $0 \leq c \leq 1$; multiplying the output of the second pair of fixed filters by a constant (1−c) in a second multiplier; and subtracting the output of the third pair of fixed filters from the outputs of the first and second multipliers.

In a second exemplary embodiment for the three-microphone circuit, the two fixed filters which use the coefficients of the third adaptive filter in the first embodiment are replaced by a single fixed filter through a repositioning of the first and second multipliers at the outputs of the other two fixed filters in the first and second pairs of fixed filters, respectively, and by combining the outputs of the first and second multipliers before filtering them in this single fixed filter. In either exemplary embodiment for the three-microphone circuit, the value of the constant (c) can be adjusted so as to track the direction of the near-end speech signal or to minimize the impact of noise.

These and other aspects and advantages of the present invention will become readily apparent from the drawings and the accompanying detailed description.

BRIEF DESCRIPTION OF THE DRAWINGS

The present invention will be better understood and its numerous objects and advantages will become apparent to those skilled in the art by reference to the following drawings in which.

DETAILED DESCRIPTION

Figure 1:
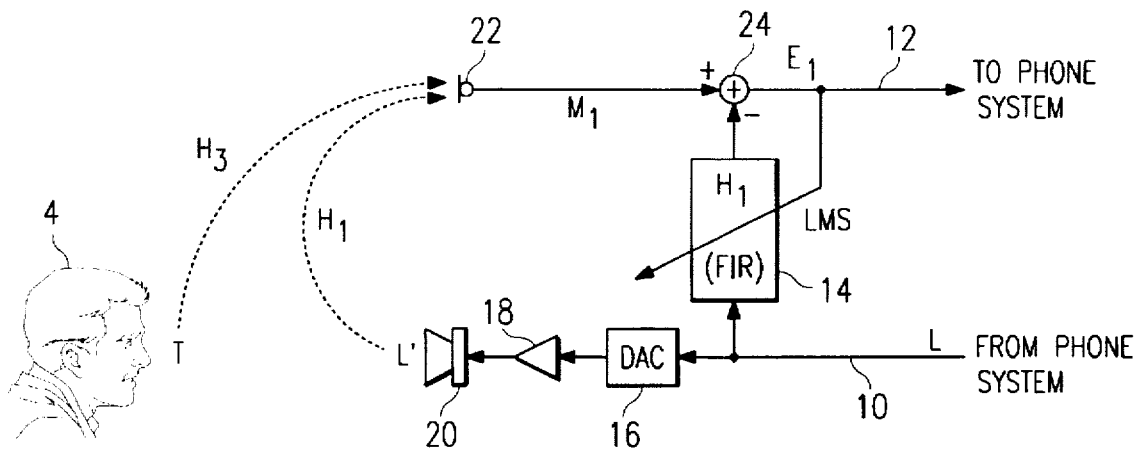
FIG. 1 is a block diagram of a common prior art echo cancellation circuit.
Figure 2:
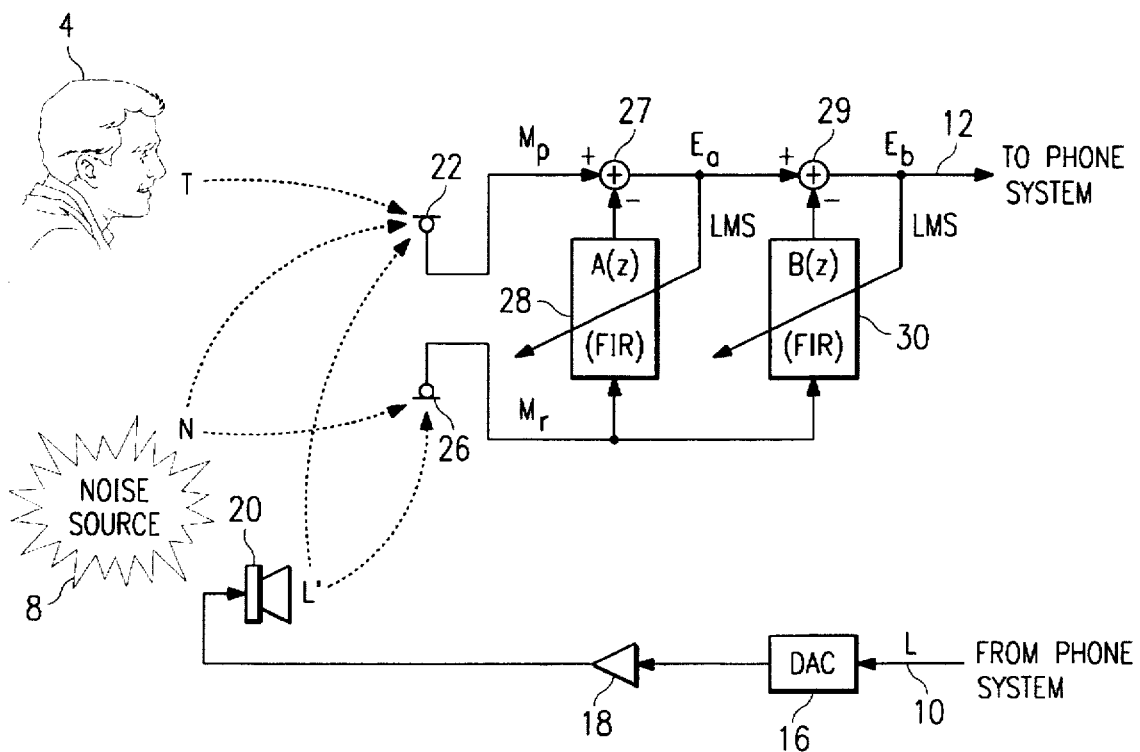
FIG. 2 is a block diagram of a certain noise and echo cancellation circuit.
Figure 3:
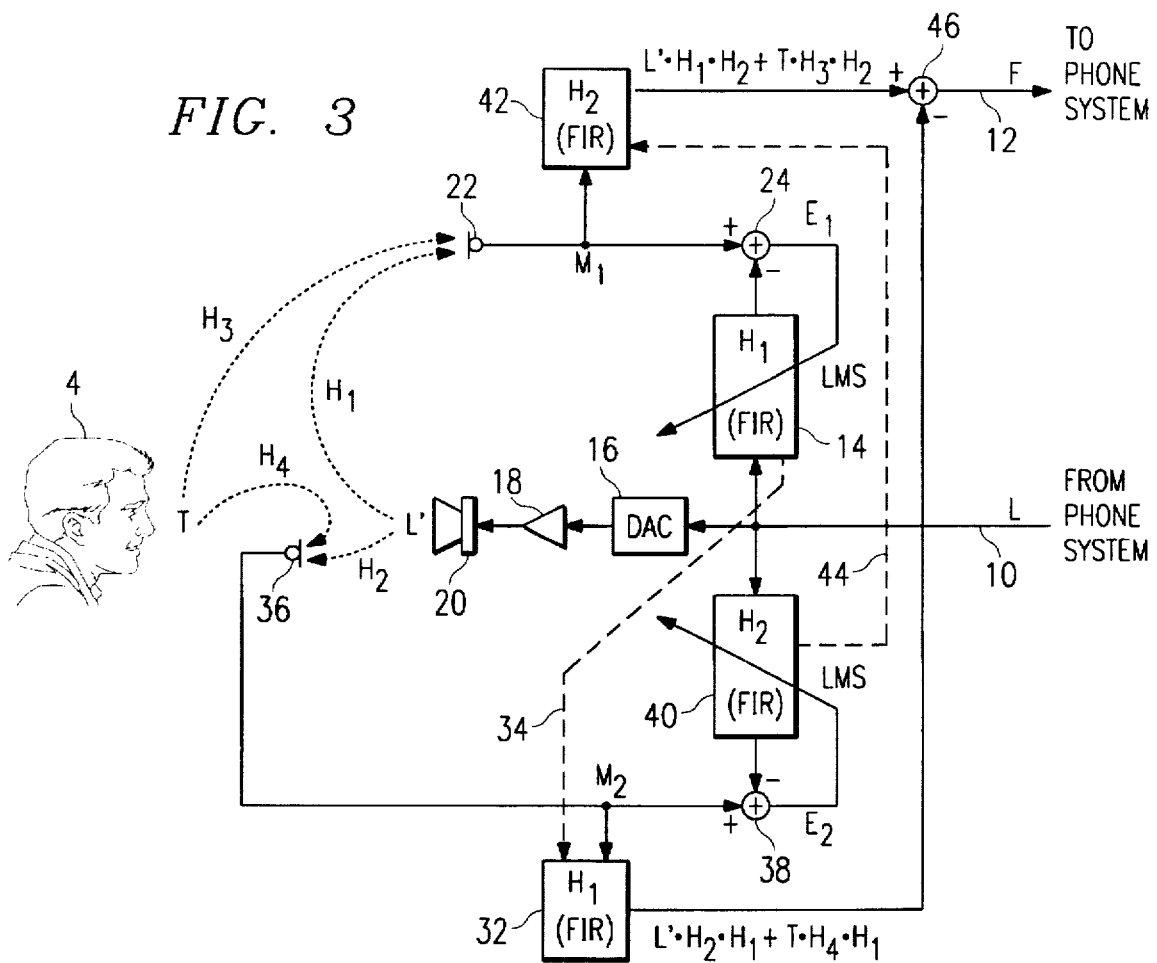
FIG. 3 is a block diagram of one embodiment of a two-microphone echo cancellation circuit constructed in accordance with the present invention.

Referring first to FIG. 3, the conventional echo cancellation circuit of FIG. 1 has been modified in accordance with one embodiment of the present invention. In this embodiment, and in addition to the microphone 22, a second microphone 36 is used for detecting the echo signal L' from the loudspeaker 20 and the talker signal T from the near-end talker 4. As will be appreciated after a review of the operation of FIG. 3 as set forth below, the microphone 36 is used in a different manner than the microphone 26 in FIG. 2. It will be further appreciated that while the distortion introduced by the components 16–20 prevents the echo estimate output of the filter 14 from completely canceling the acoustic echo at the adder 24 in FIG. 1, the filter 14 nevertheless may be used in FIG. 3 to estimate the acoustic transfer function $H_1$ since its coefficients will converge to the same values even in the presence of such distortion.

As shown in FIG. 3, the audio path between the loudspeaker 20 and the microphone 36 is characterized by an acoustic transfer function labelled $H_2$. Similarly, the audio path between the near-end talker 4 and the microphone 36 is characterized by an acoustic transfer function labelled $H_4$. The output $M_2 = L' \cdot H_2 + T \cdot H_4$ of microphone 36 is applied to one input of an adder 38. The other input of the adder 38 receives the output of an adaptive FIR filter 40 which models the function $H_2$. The input to the adaptive filter 40 is the incoming signal L on line 10 from the phone system. Therefore, the output of the adaptive filter 40 is the signal $L \cdot H_2$ which is subtracted in the adder 38 from the signal $M_2$. The adaptive filter 40 uses the LMS algorithm to minimize the error signal $E_2$ at the output of the adder 38.

With continuing reference to FIG. 3, the output $M_1 = L' \cdot H_1 + T \cdot H_3$ of the first microphone 22 is supplied to a fixed FIR filter 42 whose coefficients are copied from the taps for the adaptive filter 40, as shown by dashed line 44 between the filters 40 and 42. Therefore, the output of the fixed filter 42 is a composite echo and talker signal represented by the combination $L' \cdot H_1 \cdot H_2 + T \cdot H_3 \cdot H_2$. Similarly, the output $M_2 = L' \cdot H_2 + T \cdot H_4$ of the second microphone 36 is applied to a fixed FIR filter 32 whose coefficients are copied from the taps for the adaptive filter 14, as shown by dashed line 34 between the filters 14 and 32. Therefore, the output of the fixed filter 32 is a composite echo and talker signal represented by the combination $L' \cdot H_2 \cdot H_1 + T \cdot H_4 \cdot H_1$. As shown in FIG. 3, the output of the fixed filter 32 is subtracted from the output of the fixed filter 42 in an adder 46. Since, by definition, $L' \cdot H_1 \cdot H_2 = L' \cdot H_2 \cdot H_1$, the echo components in the outputs of the fixed filters 32 and 42 will linearly cancel each other in the adder 46, leaving an echo-free composite talker signal $T \cdot H_3 \cdot H_2 - T \cdot H_4 \cdot H_1 = T(H_3 \cdot H_2 - H_4 \cdot H_1)$ at the output F of the adder 46 for transmission on line 12 to the phone system.

It will be appreciated that the circuit of FIG. 3 achieves linear echo cancellation at the adder 46 regardless of the configuration or relative positioning of the two microphones 22 and 36, and the loudspeaker 20. Ideally, however, it is desired that the frequency response of the circuit, as reflected at the output F of the adder 46, correspond as closely as possible to the talker signal T detected at the microphone 22. Mathematically speaking, it is desired that the following equation holds true:

$$F = T(H_3 \cdot H_2 - H_4 \cdot H_1) = T \cdot H_3$$

As will be readily recognized, this equation will hold true if $H_2 = 1$ and $H_4 \cdot H_1 = 0$. The first condition can be met if the second microphone 36 is placed directly in front of and close to the loudspeaker 20 so that the ratio of direct to reflected L' signal energy detected by the microphone 36 is quite high, and $H_2$ will be very close to being an impulse function (i.e., $H_2 = 1$). The second condition is met if the second microphone 36 is positioned much closer (e.g., 10 times closer) to the loudspeaker 20 than the first microphone 22 so that $H_1 \ll H_2$, and if the first microphone 22 is pointed towards the talker 4 while the second microphone 36 is pointed away from the talker 4 and towards the loudspeaker 20 so that $H_4 \ll H_3$. Hence, $H_4 \cdot H_1 \ll H_3 \cdot H_2$ and $H_4 \cdot H_1$ can be treated as being close to 0. Under these conditions, the combination $(H_3 \cdot H_2 - H_4 \cdot H_1)$ will effectively reduce to $H_3$, and the output signal F will resemble the desired input signal $T \cdot H_3$.

Figure 4:
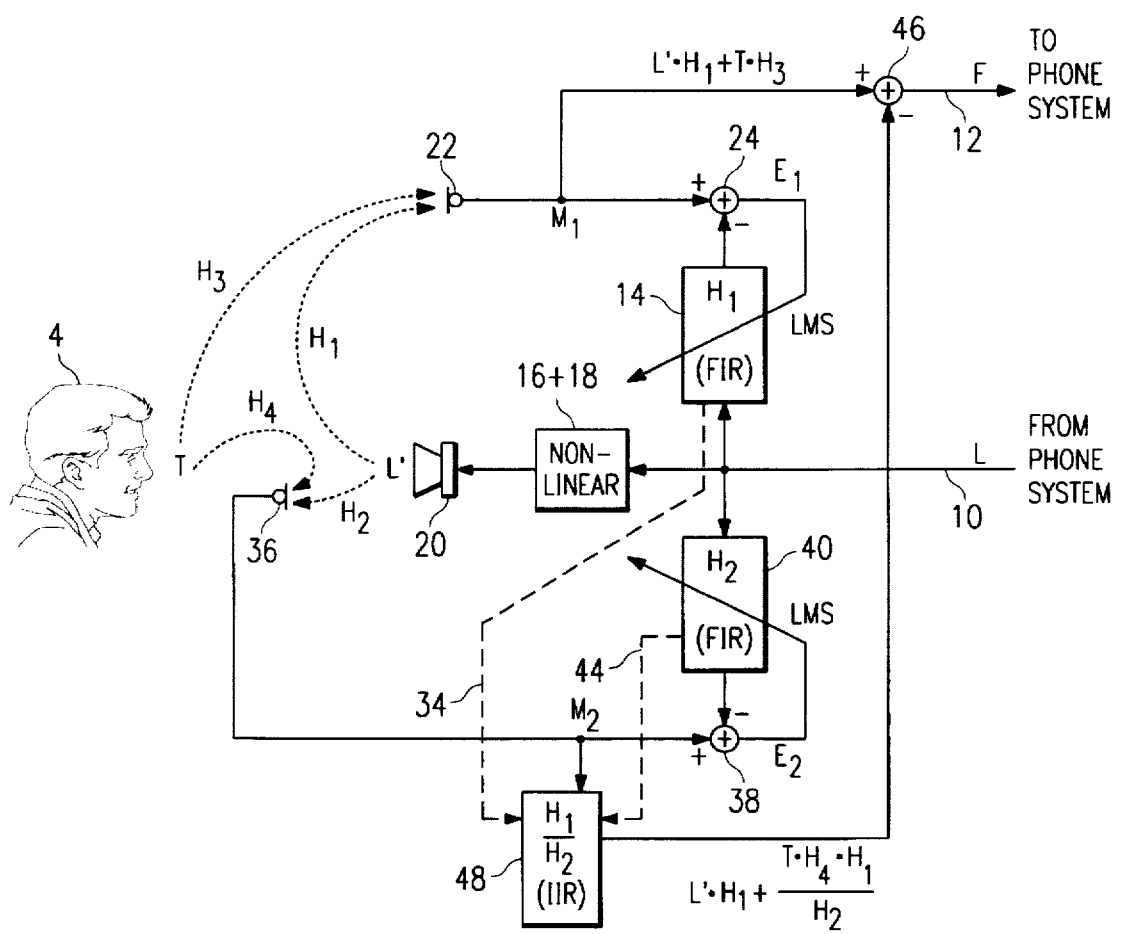
FIGS. 4–7 are various alternative embodiments of the two-microphone echo cancellation circuit of FIG. 3.

Referring next to FIG. 4, there is shown an alternative embodiment of the echo cancellation circuit of FIG. 3. In this embodiment, the output $M_1$ of microphone 22 is provided directly to adder 46 without passing through any filters such as the fixed filter 42 shown in FIG. 3. This arrangement eliminates any delay in processing the near-end talker signal T through the filter 42, in the event such delay is noticeable by the far-end talker. Furthermore, any delay in the signal T through the path $H_1$ can be minimized if the microphone 22 is positioned near the near-end talker 4. To provide for echo cancellation at the adder 46, the output $M_2$ of microphone 36 is passed through a fixed infinite impulse response (IIR) filter 48 which implements a rational acoustic transfer function $H_1/H_2$ (where the symbol "/" designates division or deconvolution in the frequency or time domain, respectively). The numerator $H_1$ of this function is provided by copying the coefficients of the adaptive filter 14, as shown by dashed line 34. The denominator $H_2$ is provided by copying the coefficients of the adaptive filter 40, as shown by dashed line 44.

With continuing reference to FIG. 4, the output $M_1$ of microphone 22 is a composite echo and talker signal represented by the combination $L' \cdot H_1 + T \cdot H_3$. The output of the filter 48 is a composite echo and talker signal represented by the combination $L' \cdot H_1 + T \cdot H_4 \cdot H_1/H_2$. The output of the filter 48 is subtracted from the signal $M_1$ in the adder 46. Assuming that the delay for the signal L' through path $H_2$ is smaller than or equal to the delay through path $H_1$ (which would be the case, for example, if microphone 36 is much closer to the loudspeaker 20 than microphone 22, or if microphone 36 and loudspeaker 20 are contained within the same assembly), causality will be maintained for the filter 48. The echo component $L' \cdot H_1$ in the signal $M_1$ will be effectively cancelled by the equivalent component from the output of the fixed filter 48. Thus, the signal F on outgoing line 12 to the phone system will be echo-free.

Figure 5:
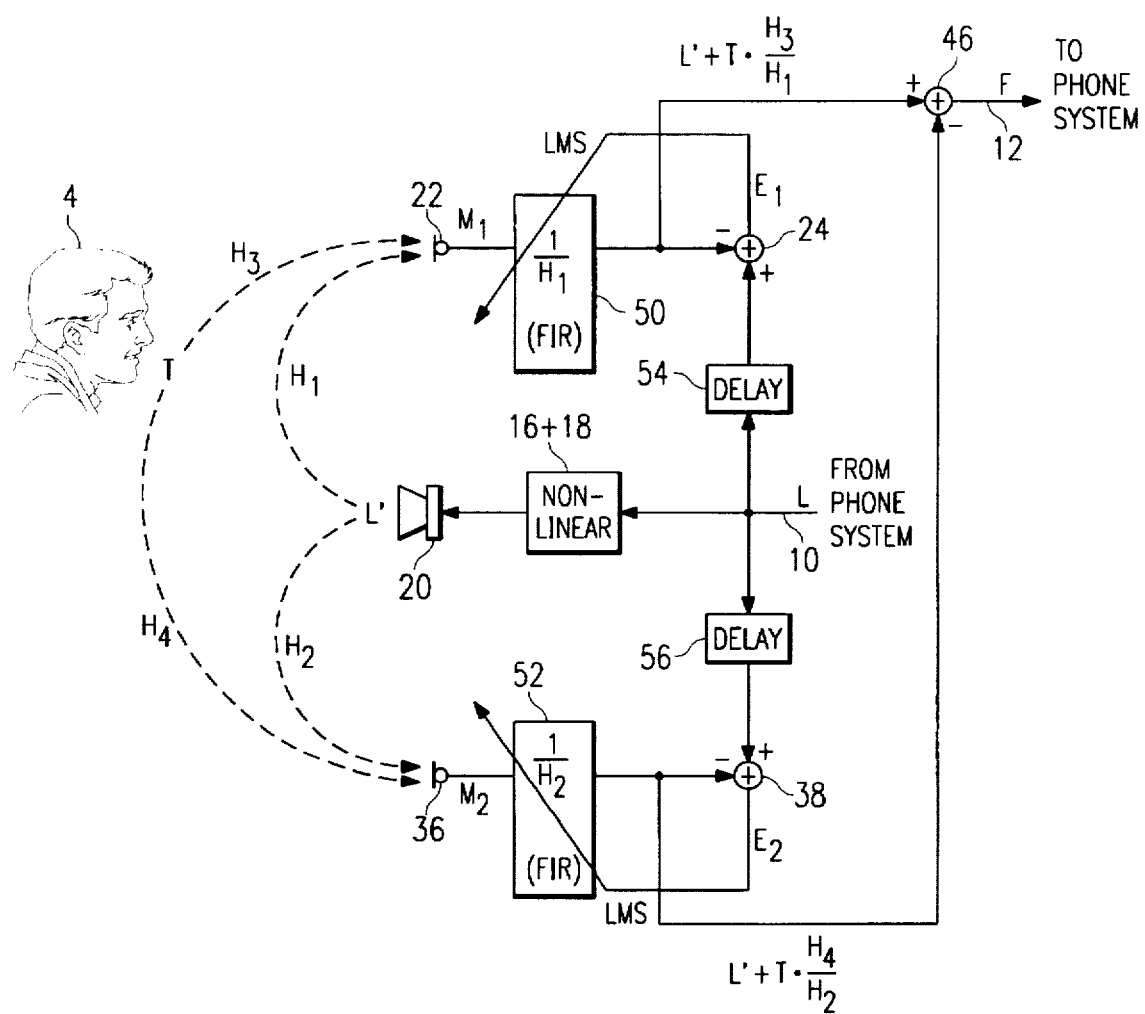

Referring next to FIG. 5, there is shown another alternative embodiment of the echo cancellation circuit of FIG. 3. This embodiment may be considered more efficient than the embodiment shown in FIG. 4, as it avoids the processing and memory requirements associated with the copying of coefficients of filters, such as the filters 14 and 40 in FIG. 4. Furthermore, this embodiment avoids the risk associated with using an IIR filter which may become unstable at some frequency, such as may occur if $H_2$ in the denominator of the filter 48 in FIG. 4 were to go to zero at any frequency. In FIG. 5, the outputs of the microphones 22 and 36 are supplied to adaptive FIR filters 50 and 52, respectively, which estimate the rational transfer functions $1/H_1$ and $1/H_2$, respectively, and which use the LMS algorithm to minimize the error signals $E_1$ and $E_2$ at the output of the adders 24 and 38, respectively. As will be appreciated by persons skilled in the art, since FIR filters are unconditionally stable, the adaptive filters 50 and 52, which represent FIR approximations of IIR functions, will be stable at all frequencies.

Also shown in FIG. 5 are delay elements 54 and 56 which are used for ensuring causality of the filters 50 and 52, respectively, and for time alignment of the input signals to each of the adders 24 and 38, respectively. In other words, without the delay elements 54 and 56, the filters 50 and 52 would have to estimate a negative delay in order to compensate for the positive delay of the signal L through the part of the loop consisting of the components 16–20, the acoustic path $H_1$ or $H_2$, and the microphone 22 or 36, as applicable. Inclusion of the delay elements 54 and 56 allows the filters 50 and 52, respectively, to converge to a positive delay equal to the difference between the amount of delay in the elements 54 and 56, respectively, and the remaining part of the loop. As will be appreciated by persons of ordinary skill in the art, the delay elements 54 and 56 can operate linearly so as not to introduce any distortion in the signal L. It will also be appreciated that the amount of delay through the elements 54 and 56 should be the same so as to ensure time alignment of the outputs of the filters 50 and 52, which form the inputs to the adder 46. Thus, it is possible to substitute for the delay elements 54 and 56 a single delay element through which the incoming signal L passes before branching to the adders 24 and 38.

With continuing reference to FIG. 5, the output of the adaptive filter 50 is a composite echo and talker signal represented by the combination $L' + T \cdot H_3/H_1$. Similarly, the output of the adaptive filter 52 is a composite echo and talker signal represented by the combination $L' + T \cdot H_4/H_2$. The output of the filter 52 is subtracted from the output of the filter 50 in the adder 46 thereby cancelling the echo component L' and leaving the talker signal $T(H_3/H_1 - H_4/H_2)$. Consequently, the signal F on outgoing line 12 to the phone system will be echo-free. It should be noted that, although the microphones 22 and 36 are positioned somewhat equidistant from the loudspeaker 20 in FIG. 5, such an arrangement is not required for effective echo cancellation at the adder 46, but is for illustration purposes only. The only requirement for proper operation of the circuit in FIG. 5 is that $H_3/H_1 >> H_4/H_2$ so that the talker signal T will be substantially preserved after echo cancellation at the adder 46. This requirement can be met, for example, if the microphone 22 is pointed towards the near-end talker 4 and away from the loudspeaker 20, while the microphone 36 is pointed away from the near-end talker 4 and towards the loudspeaker 20, so that $H_3 >> H_4$ and $H_1 << H_2$.

Figure 6:
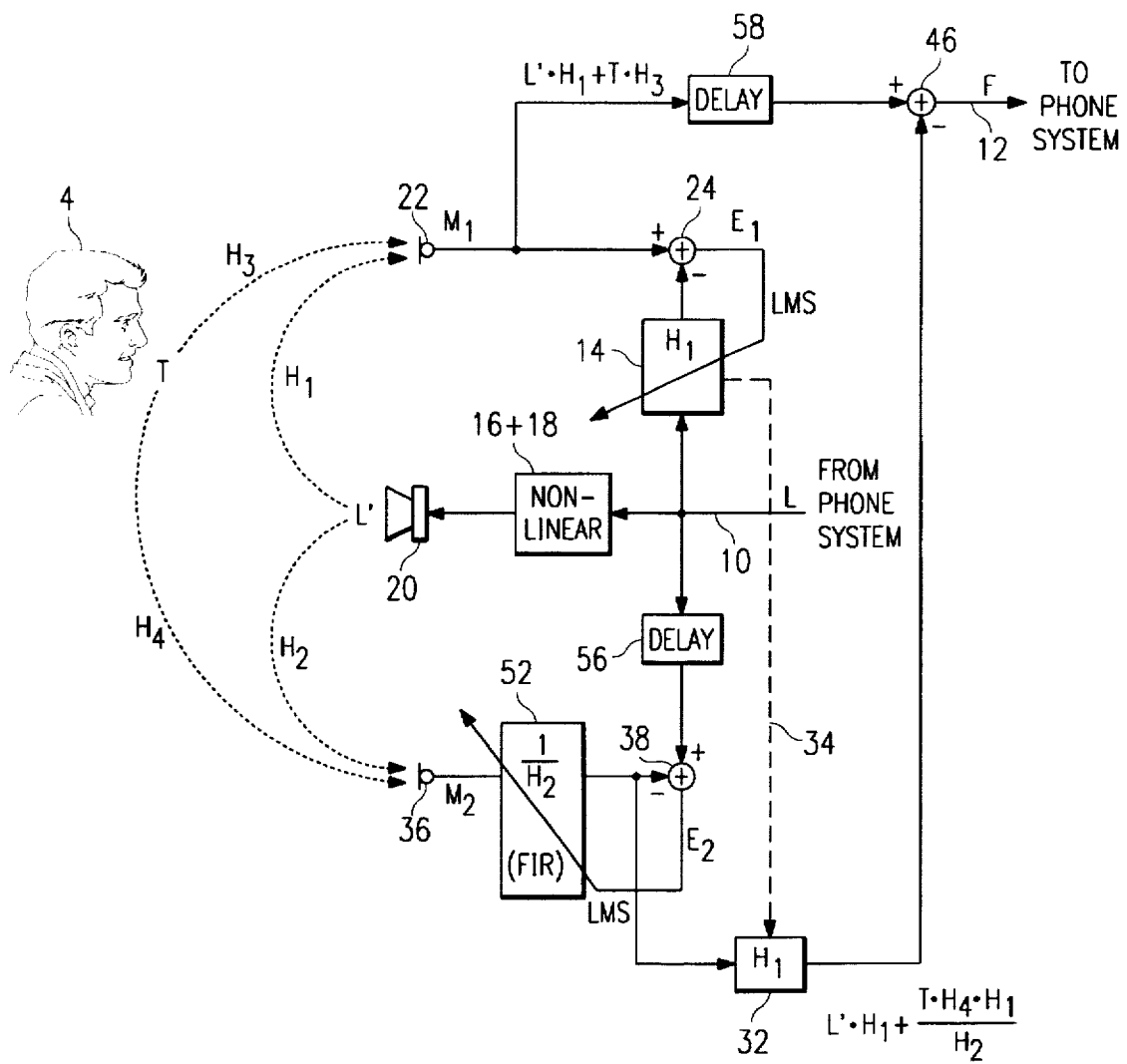

Referring next to FIG. 6, there is shown yet another alternative embodiment of the echo cancellation circuit of FIG. 3. This embodiment may be considered as somewhat of a hybrid of the circuits shown in FIGS. 3 and 5 since it uses some components from each of those two circuits. The circuit in FIG. 6 avoids the use of potentially unstable IIR filters such as the filter 48 in FIG. 4, but does require some copying of coefficients, albeit to a stable IIR filter 32 as was used in FIG. 3. The circuit in FIG. 6 uses the delay element 56 for the same purpose as in FIG. 5 (i.e., time alignment of the inputs to the adder 38), but does not require the use of the delay element 54 from FIG. 5 since the adaptive filter 14 in FIG. 6 can properly account for the delay of the signal L in that part of the circuit (i.e., for the purpose of time alignment of the inputs to the adder 24). The circuit of FIG. 6, however, may require the use of another linear delay element 58 to ensure that the output $M_1$ of microphone 22 arrives at the adder 46 in time alignment with the output of the FIR filter 52 so that the echo components in these two outputs will effectively cancel each other in the adder 46. It will appreciated that, for this purpose, the delay through element 58 should match the delay through element 56 which, in turn, is equivalent to the delay through the acoustic path $H_2$ and the filter 52. Since the filter 32 incorporates an estimate of the delay through the acoustic path $H_1$, the signal relayed from the microphone 36 to the adder 46 will encounter the same delay as the signal relayed from the microphone 22 to the adder 46 if the delay elements 56 and 58 have matching delays.

As can be seen from FIG. 6, the output $M_1$ of the microphone 22 is a composite echo and talker signal represented by the combination $L' \cdot H_1 + T \cdot H_3$. The output of the filter 32 is a composite echo and talker signal represented by the combination $L' H_1 + T \cdot H_4 \cdot H_1/H_2$. The output of the filter 32 is subtracted in the adder 46 from the (delayed) output $M_1$ of the microphone 22 thereby cancelling the echo component $L' \cdot H_1$, and leaving the talker signal $T(H_3 - H_4 \cdot H_1/H_2)$. Consequently, the signal F on outgoing line 12 to the phone system will be echo-free. As with FIG. 5, although the microphones 22 and 36 are positioned somewhat equidistant from the loudspeaker 20 in FIG. 6, such arrangement is not required for effective echo cancellation at the adder 46 but is for illustration purposes only. The only requirement for proper operation of the circuit in FIG. 6 is that $H_3>>H_4 \cdot H_1/H_2$ so that the talker signal T will be substantially preserved after echo cancellation at the adder 46. This requirement can be met, for example, if the microphones 22 and 36 are positioned or pointed in such a manner that microphone 22 receives substantially greater energy for the talker signal T than microphone 36, which means that $H_3>>H_4$.

Figure 7:
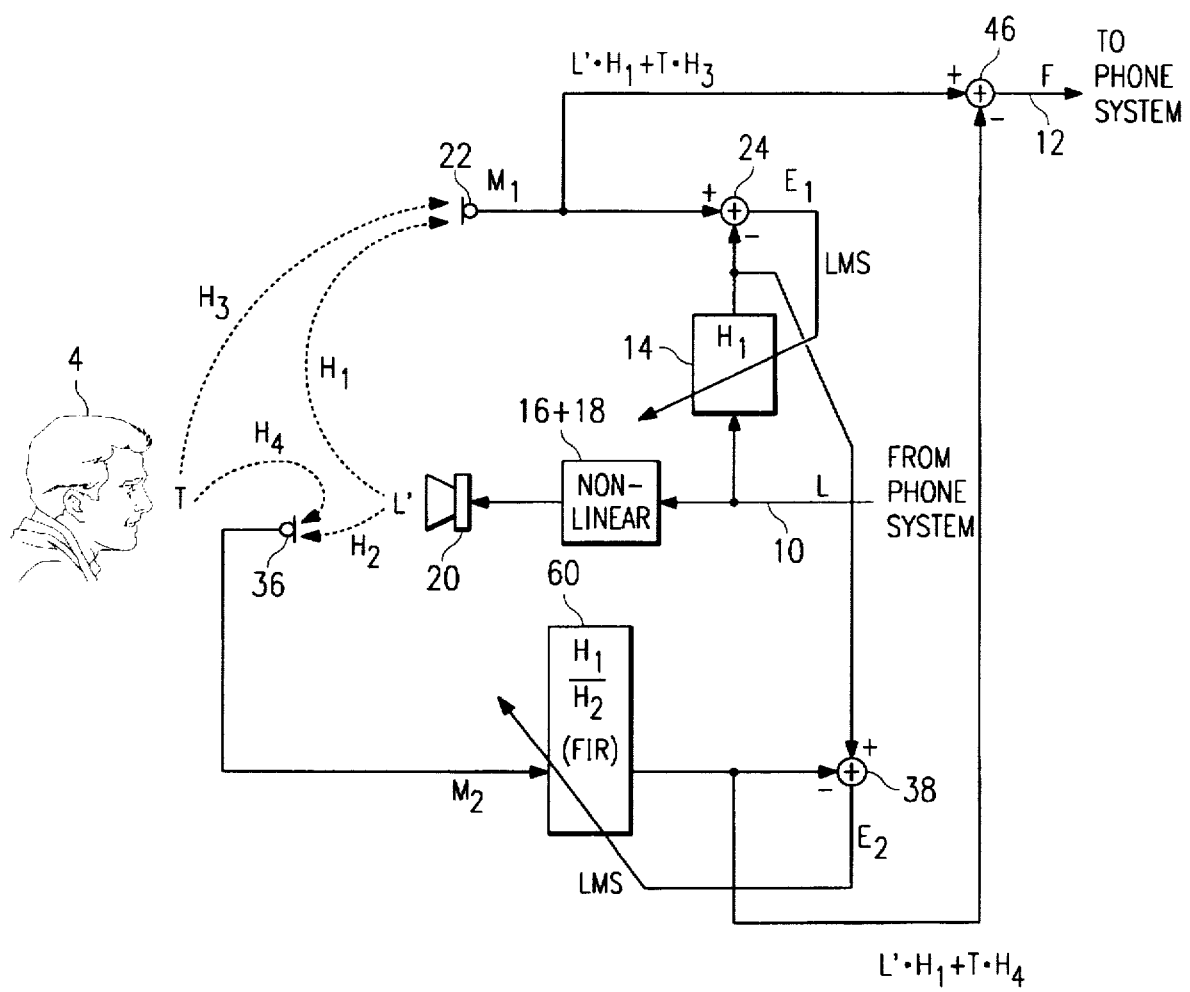

Referring next to FIG. 7, there is shown a further alternative embodiment of the echo cancellation circuit of FIG. 3. This embodiment combines the advantages, while avoiding any potential disadvantages, associated with the previously discussed embodiments. In particular, this embodiment avoids the copying of filter coefficients or the use of IIR filters or delay elements while providing the desired echo cancellation at the adder 46. In FIG. 7, the output $M_1$ of the microphone 22 is fed directly to the adder 46. This means that, if microphone 22 is placed close to the near-end talker 4, there will be minimal delay of the signal T that is detected by the microphone 22. An adaptive FIR filter 60 estimates the rational transfer function $H_1/H_2$ based on the output of the adaptive filter 14 and the output $M_2$ of the microphone 36. As mentioned before, despite the implementation of a rational function, the filter 60 will be stable because it is an FIR filter.

With continuing reference to FIG. 7, the output $M_1$ of the microphone 22 is a composite echo and talker signal represented by the combination $L' \cdot H_1+T \cdot H_3$. The output of the filter 60 is a composite echo and talker signal represented by the combination $L' \cdot H_1+T \cdot H_4$. The output of the filter 60 is subtracted from the signal $M_1$ in the adder 46 thereby cancelling the echo component $L' \cdot H_1$ and leaving the talker signal $T(H_3-H_4)$. Consequently, the signal F on outgoing line 12 to the phone system will be echo-free. Furthermore, so long as the microphones 22 and 36 are positioned relative to the talker 4 such that $H_3>>H_4$, the signal F at the output of the circuit will be very close to the desired talker signal $T \cdot H_3$ appearing at the input of the circuit. In sum, the circuit of FIG. 7 achieves echo cancellation with minimum delay or distortion of the talker signal T.

For illustration purposes, FIG. 7 shows the microphone 36 placed directly in front of the loudspeaker 20, which means that $H_2$ should be very close to 1 and the function $H_1/H_2$ will closely approximate $H_1$. Under these circumstances, the adaptive filter 60 would essentially model the echo path $H_1$ from the loudspeaker 20 to the microphone 22. However, it should be noted that the circuit of FIG. 7 can achieve the desired echo cancellation even if the microphones 22 and 36 are positioned, for example, substantially equidistant from the loudspeaker 20. As long as the talker 4 is closer to microphone 22 than microphone 36, $H_3$ will be greater than $H_4$ and the talker signal T will be preserved at the output of the circuit. However, if the microphones 22 and 36 are positioned relative to the loudspeaker 20 such that the delay through the acoustic path $H_2$ is longer than the delay through the acoustic path $H_1$, it may be necessary to apply a delay to the signal $M_1$ (e.g., as shown by the delay element 58 in FIG. 6) in order to ensure causality of the filter 60 in FIG. 7 (otherwise the filter 60 would have to estimate a negative delay).

Although the effect of background noise N from a noise source 8, as shown in FIG. 2, has not been specifically discussed in connection with FIGS. 3–7, it will be readily appreciated that ambient noise will be cancelled at the adder 46 to a degree that is dependent upon the relative amplitude, frequency and phase of the noise signals detected by the microphones 22 and 36, respectively, and on the nature of the filter transfer functions applied to these noise signals before reaching the adder 46. However, if the gains for the acoustic echo paths $H_1$ and $H_2$ to the microphones 22 and 36, respectively, can be made substantially identical to each other and to the gains for the corresponding acoustic noise paths, the noise components received at the adder 46 can be cancelled in the same way and using the same filters as for the echo components (at least for those noise components at the audible low frequencies in, for example, the 300–800 Hz range, which should be detected in phase and at equal amplitude at each of the microphones 22 and 36). This dual noise and echo cancellation can be accomplished by placing the microphones 22 and 36 at an equidistance from the loudspeaker 20 so that $H_1=H_2$. To ensure that the near-end talker signal T is not also cancelled in the adder 46, the microphone 22 can be placed much closer to the talker 4 than the microphone 36 so that $H_3>>H_4$. An example of such an arrangement is shown in FIGS. 8–9.

Figure 8:
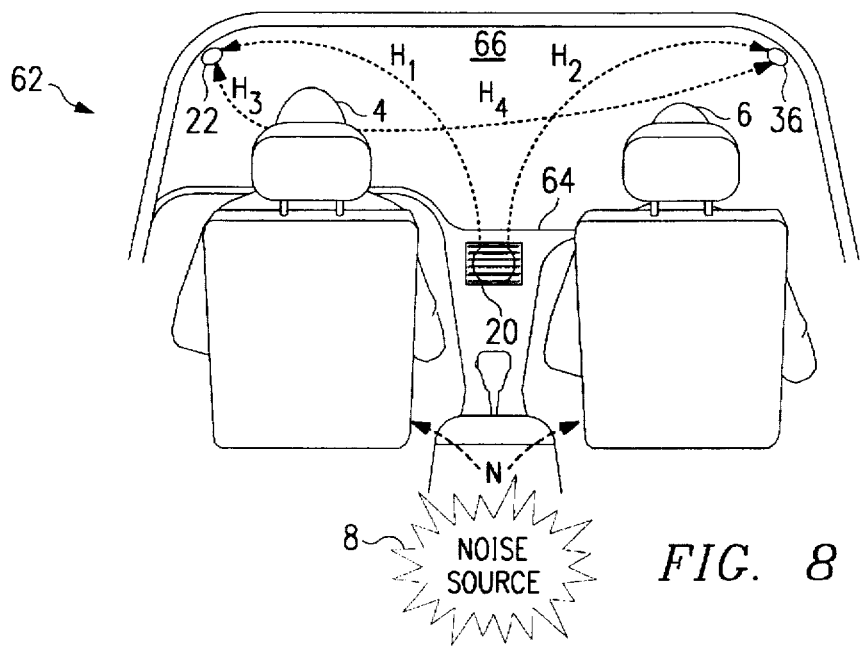
FIGS. 8–9 are two different views of an exemplary configuration of the two microphones from any of the circuits of FIGS. 3–7, this configuration being used for both noise and echo cancellation in a hands-free accessory for a cellular phone mounted in a conventional vehicle.
Figure 9:
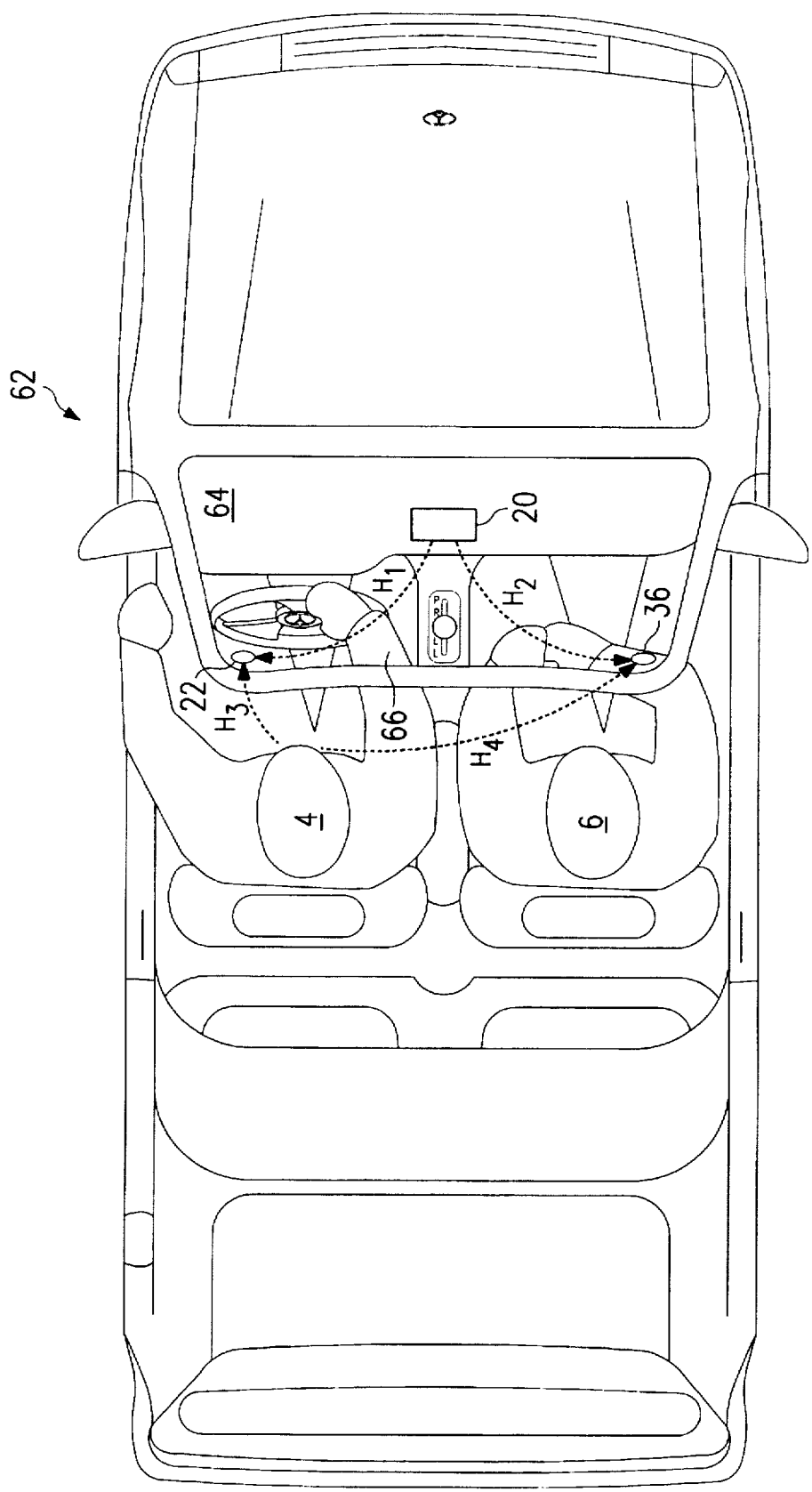

Referring next to FIGS. 8–9, there are shown two generalized views of an exemplary configuration of the microphones 22 and 36 and the loudspeaker 20 from FIGS. 3–7 in a hands-free cellular phone application. The cellular phone (not shown) is mounted in a conventional vehicle 62 which has a dashboard 64 and a windshield 66. The microphones 22 and 36 may be provided as part of a hands-free accessory kit for use with the cellular phone. The loudspeaker 20 may also be provided as part of the accessory kit or may be part of the original radio equipment on the vehicle 62. In the example shown in FIGS. 8–9, the loudspeaker 20 is centrally mounted below the dashboard 64, and the microphones 22 and 36 are positioned on opposite upper corners of the windshield 66. The microphone 22 is seen to be closer to the near-end talker 4 who, in this case, is the driver of the vehicle 62. The microphone 36, on the other hand, is seen to be closer to another near-end talker 6 who, in this case, is the front seat passenger in the vehicle 62. This arrangement allows both near-end talkers 4 and 6 to participate in a hands-free conversation.

Also illustrated in FIGS. 8–9 are the acoustic transfer functions $H_1$–$H_4$ corresponding to those shown in FIGS. 3–7 for the echo signal L' from the loudspeaker 20, and the signal T from the near-end talker 4, as applicable. For simplicity, the acoustic transfer functions for the speech signal from the near-end talker 6 are not shown or discussed here, although it will be understood that the analysis of noise and echo cancellation for the near-end talker 6 would mirror the analysis for the near-end talker 4 as presented generally in connection with FIGS. 3–9. In the example shown in FIGS. 8–9, the audio paths from the loudspeaker 20 to the microphones 22 and 36, respectively, are depicted as being of equal length and, therefore, the gains for the functions $H_1$ and $H_2$ should be substantially equal (i.e., $H_1 \approx H_2$). On the other hand, the audio path from the talker 4 to the microphone 22 is substantially shorter than the audio path from the talker 4 to the microphone 36, and, therefore, the gain for the function $H_3$ should be substantially greater than for the function $H_4$ (i.e., $H_3>>H_4$).

Since the noise signal N and echo signal L' will be highly correlated at each the microphones 22 and 36 in FIGS. 8–9, they will be similarly cancelled at the adder 46 in any of the circuits shown in FIGS. 3–7. In addition, since the microphone 22 receives a much larger talker signal than the microphone 36, the talker signal will be substantially preserved after noise and echo cancellation in the adder 46. In some installations, however, it may be necessary to use an automatic gain control (AGC) on the output signal F in order to ensure a proper signal level (signal-to-noise ratio) on line 12 to the phone system. The AGC will also provide the far-end talker with a more consistent received volume level as the near-end talker adjusts his voice in reaction to changing noise conditions. Furthermore, the AGC may be needed to reduce the effect of quantization noise resulting from the use of a codec in the digital phone system.

Figure 10:
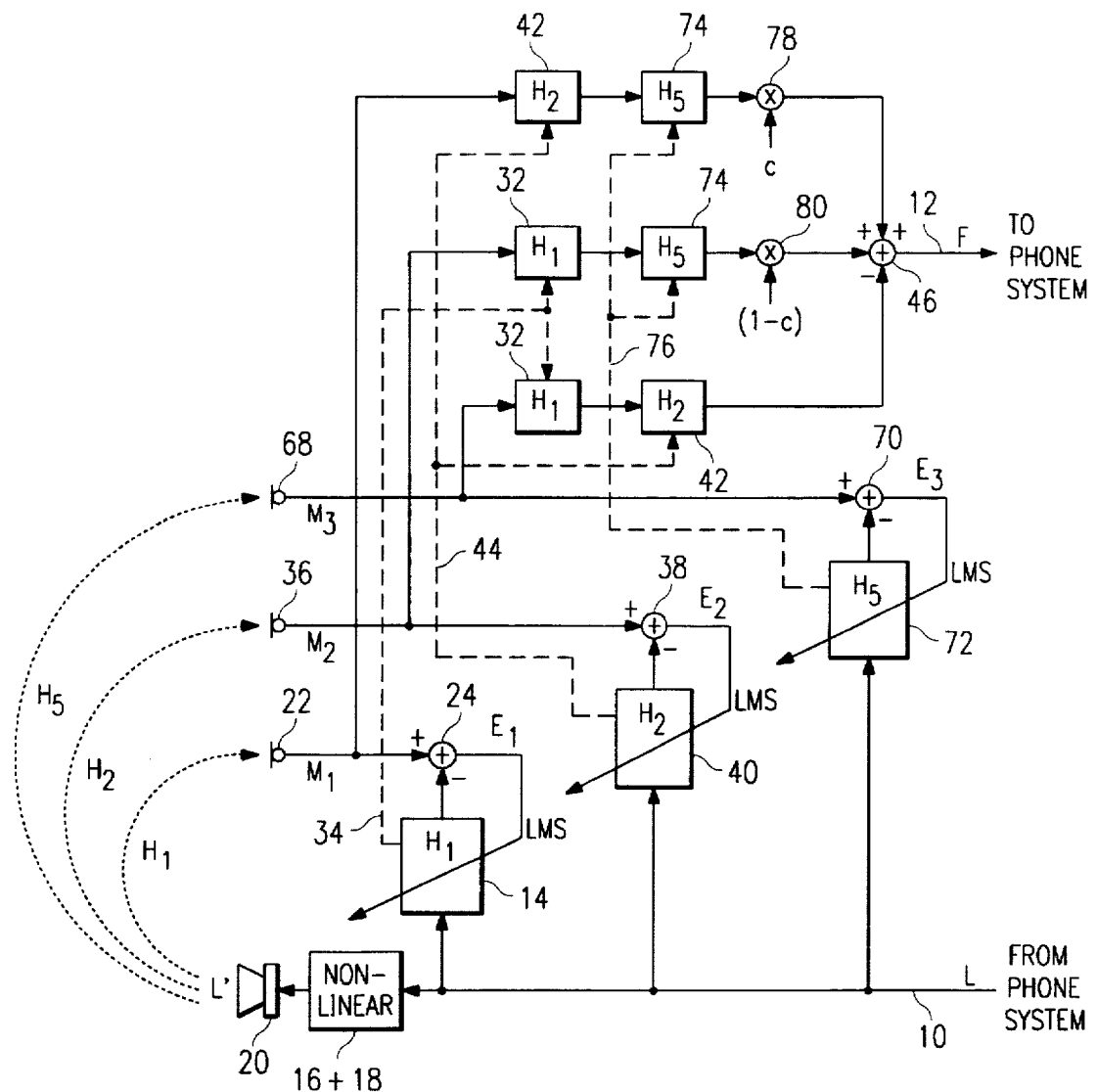
FIGS. 10–11 are alternative embodiments of a three-microphone echo cancellation circuit constructed in accordance with the present invention.
Figure 11:
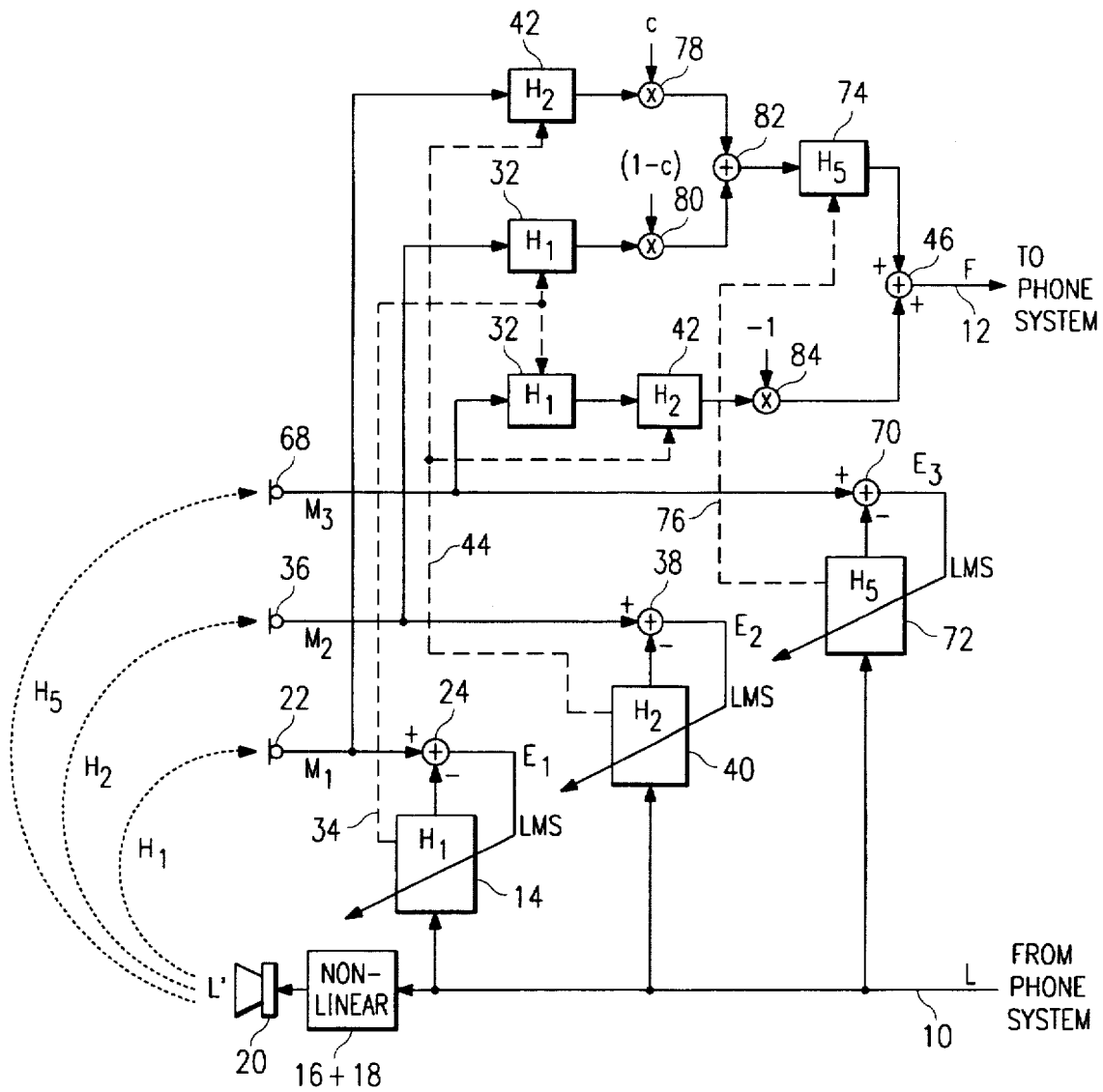

While FIGS. 3–9 have illustrated the present invention in circuits using only two microphones, it will be appreciated that the approach of the present invention of linearly combining different microphone signals to achieve echo suppression can be used with three or more microphones. FIGS. 10–11 provide two examples of echo cancellation circuits which use three microphones in accordance with the present invention. These two examples extend the basic circuit in FIG. 3 from two microphones to three microphones. It should be clearly understood, however, that the circuits in FIGS. 4–9 could be similarly extended and, furthermore, it will be readily apparent to persons of ordinary skill in the art that it is possible, in accordance with the present invention, to construct many different circuits which use more than three microphones.

Referring now to FIG. 10, adaptive filters 14 and 40 model the acoustic transfer functions $H_1$ and $H_2$ for the echo paths from the loudspeaker 20 to the microphones 22 and 36, respectively, and use the LMS algorithm to minimize the error signals $E_1$ and $E_2$ at the output of the adders 24 and 38, respectively, in the same manner as discussed in connection with the circuit shown in FIG. 3. The circuit of FIG. 10, however, uses a third microphone 68, an adder 70 and an adaptive filter 72 which models the acoustic transfer function $H_5$ for the echo path from the loudspeaker 20 to the microphone 68, and which also uses the LMS algorithm to minimize the error signal $E_3$ at the output of the adder 70. As before, the objective is to manipulate the echo components in the outputs of the microphones 22, 36 and 68 such that they can be linearly combined and cancelled in the adder 46. For this purpose, the circuit of FIG. 10 uses two fixed filters 32 whose coefficients are copied along line 34 from the adaptive filter 14, two fixed filters 42 whose coefficients are copied along line 44 from the adaptive filter 40, and two fixed filters 74 whose coefficients are copied along line 76 from the adaptive filter 72. In other words, the fixed filters 32, 42 and 74 implement the transfer functions $H_1$, $H_2$ and $H_5$, respectively, as shown in FIG. 10.

With continuing reference to FIG. 10, the output $M_1$ of microphone 22 is passed through two successive stages of filters 42 and 74, respectively, and then multiplied by a constant (c) in a multiplier 78 (where $0 \leq c \leq 1$). The echo component at the output of the multiplier 78 will be the signal $c \cdot L' \cdot H_1 \cdot H_2 \cdot H_5$, which is fed to the adder 46. The output $M_2$ of microphone 36 is passed through two successive stages of filters 32 and 74, respectively, and then multiplied by a constant (1−c) in a multiplier 80. The echo component at the output of the multiplier 80 will be the signal $(1-c) \cdot L' \cdot H_2 \cdot H_1 \cdot H_5$, which is also fed to the adder 46. The output $M_3$ of microphone 68 is passed through two successive stages of filters 32 and 42, respectively, and the resulting echo component $L' \cdot H_5 \cdot H_1 \cdot H_2$ is then fed directly to the adder 46 for subtraction from the other echo signals received by the adder 46. In the adder 46, the received echo components will cancel each other and the output F will be echo-free as shown by the following formula:

$$F(\text{echo}) = c \cdot L' \cdot H_1 \cdot H_2 \cdot H_5 + (1-c) \cdot L' \cdot H_2 \cdot H_1 \cdot H_5 - L' \cdot H_5 \cdot H_1 \cdot H_2 = 0$$

FIG. 11 is a variation of FIG. 10 aimed at reducing the number of fixed filters 32, 42 and 74 and the associated amount of coefficient copying. As can be seen from a comparison of FIGS. 10–11, the circuit of FIG. 11 replaces the two fixed filters 74 in the circuit of FIG. 10 with one fixed filter 74 and an adder 82 which combines the outputs of the multipliers 78 and 80 before passing the combination through the single fixed filter 74 and onto the adder 46. The output of the fixed filter 74 in FIG. 11, therefore, is equivalent to the sum of the outputs of the multipliers 78 and 80 in FIG. 10, and echo cancellation will occur in the adder 46 of FIG. 11 in a manner equivalent to FIG. 10. FIGS. 10–11 also illustrate that the echo signal to be subtracted in the adder 46 can be either supplied to a negative (inverting) lead of the adder 46 as shown in FIG. 10 or, alternatively, multiplied by the constant (−1) in a multiplier 84 before being supplied to the adder 46 as shown in FIG. 11.

An examination of FIGS. 10–11 reveals the basic teachings of the present invention which can be extended to circuits with an arbitrary number of microphones (i.e., greater than three). To accomplish echo cancellation at the adder 46, an approach akin to a "least common denominator" is used wherein each of the outputs of the microphones is filtered through a plurality of filtering stages which impart on these outputs a common set of transfer functions. As needed, one or more of the microphone outputs can be multiplied by appropriate constants so that when they are summed (or subtracted) in the adder 46, no echo signal is left. Returning briefly to FIG. 10, for example, the output $M_1$ of microphone 22, the echo path to which has the transfer function $H_1$, is passed through filters 42 and 74 which implement the transfer functions $H_2$ and $H_5$ corresponding to the echo paths to the two other microphones 36 and 68, respectively. Similarly, the output $M_2$ of microphone 36, the echo path to which has the transfer function $H_2$, is passed through filters 32 and 74 which implement the transfer functions $H_1$ and $H_5$ corresponding to the echo paths to the two other microphones 22 and 68, respectively. A similar process is followed for the output $M_3$ of microphone 68. Selective multiplication by the constants (c) and (1-1c) in FIG. 10 ensures that the various echo signals are weighted properly and can completely cancel each other in the adder 46.

It will be further appreciated that the value of the constant (c) in FIGS. 10–11 may be varied between 0 and 1 so as to "steer" the microphones 22 and 36 towards the speech signal T from the near-end talker 4 or away from the noise signal N from the noise source 8, without affecting echo cancellation at the adder 46. For example, the microphones 22 and 36 may be positioned on the windshield 66 as generally shown in FIGS. 8–9, while the microphone 68 may be positioned close to and pointed towards the loudspeaker 20 inside the vehicle 62. If c=0, the output of the multiplier 78 in FIGS. 10–11 will be zero, and only the output $M_2$ of the microphone 36 will be passed to the adder 46. Conversely, if c=1, the output of the multiplier 80 in FIGS. 10–11 will be zero, and only the output $M_1$ of the microphone 22 will be passed to the adder 46. Between these two extremes, the value of (c) can be adjusted to increase the sensitivity of one of the microphones 22 and 36 to the speech signal T so as to automatically track the head movements of the near-end talker 4. Similarly, the value of (c) can be adjusted to decrease the sensitivity of one of the microphones 22 and 36 to the noise signal N so as to minimize noise where, for example, this microphone is closer to the noise source 8. The most appropriate value of (c) at any moment may be determined, for example, through beam forming techniques and microphone arrays, which are well known in the art.

It should now be apparent from FIGS. 3–11 and the accompanying discussion that each of the circuits of the present invention achieves the desired cancellation of the echo signal detected through a first microphone by using at least one other microphone for establishing another path for the echo signal to an appropriate node in the circuit where the echo signal detected by the first microphone can be cancelled by the echo signal detected by one or more of the other microphones. Effectively, a beam pattern is formed for the echo signal through the use of a plurality of microphones such that a null exists for this signal at a given node in the echo cancellation circuit. At this node, both the linear and non-linear distortion components of the echo signal are cancelled as well as a significant portion of the ambient noise. It can also be seen that the present invention achieves echo and noise suppression with two or more microphones in a wide variety of configurations, and that when three or more microphones are used, the sensitivity of at least some of the microphones can be controlled by appropriate weighting of the microphone outputs so as to maximize the speech signal output level or minimize the noise signal output level without affecting the echo cancellation performed by the circuit.

It will be noted that, for illustration purposes, the adaptive filters in the circuits of FIGS. 3–11 used the Least Mean Squares (LMS) algorithm to estimate the desired functions. However, it will be appreciated by those skilled in the art that many other estimation algorithms may also be used. In particular, two categories of algorithms are suitable for this purpose. The first category of algorithms, which is known as Gradient Descent algorithms, includes LMS, normalized LMS (NLMS), and block LMS (BLMS). The second category of algorithms, which is known as Least Squares Estimation (LSE) algorithms, includes Kalman Filtering, Recursive Least Squares (LRS), and Fast Transversal Filter (FIF).

It will also be noted that while only one loudspeaker is shown in the circuits of FIGS. 3–11, the teachings of the present invention can be easily extended to echo cancellation circuits incorporating a plurality of loudspeakers. In general, those skilled in the art will readily recognize that many modifications and variations may be made to the embodiments of the present invention disclosed herein without substantially departing from the spirit and scope of the present invention. Accordingly, the form of the invention disclosed herein is exemplary and is not intended as a limitation on the scope of the invention as defined in the following claims.

I claim:

1. In an audio circuit comprising a microphone and a loudspeaker, said microphone detecting a speech signal from a near-end user, said loudspeaker receiving a far-end speech signal and generating a corresponding echo signal that is also detected by said microphone, a method of cancelling the echo signal comprising the steps of:

providing at least one other microphone in said audio circuit for detecting said echo signal, said at least one other microphone also detecting said near-end speech signal;

estimating a plurality of acoustic transfer functions in a plurality of adaptive filters each having a plurality of coefficients, at least one of said adaptive filters using the far-end speech signal as a reference signal for adjusting its coefficients;

filtering the outputs of one or more of said microphones using the coefficients of one or more of said adaptive filters; and combining the filtered and any unfiltered microphone outputs so as to substantially cancel said echo signal while substantially preserving said near-end speech signal.

2. The method of claim 1 wherein said filtering step comprises filtering at least one microphone output in a fixed filter whose coefficients are copied from one or more of said adaptive filters.

3. The method of claim 1 wherein said filtering step comprises filtering at least one microphone output in an adaptive filter whose coefficients are adapted using the far-end speech signal as a reference signal.

4. The method of claim 1 wherein said filtering step comprises filtering at least one microphone output in an adaptive filter which uses the output of another adaptive filter as a reference signal.

5. The method of claim 1 wherein said audio circuit includes first and second microphones, the echo signal from said loudspeaker to said first and second microphones having acoustic transfer functions $H_1$ and $H_2$, respectively, and wherein the method comprises the steps of:

estimating $H_1$ in a first adaptive filter using said far-end speech signal as a reference signal for adapting the coefficients of said first adaptive filter;

estimating $H_2$ in a second adaptive filter using said far-end speech signal as a reference signal for adapting the coefficients of said second adaptive filter;

filtering the output of said first microphone in a first fixed filter using the coefficients of said second adaptive filter;

filtering the output of said second microphone in a second fixed filter using the coefficients of said first adaptive filter; and subtracting the output of said second fixed filter from the output of said first fixed filter.

6. The method of claim 5 further comprising the step of positioning said first and second microphones relative to said near-end user and said loudspeaker such that said first microphone receives a substantially higher level of said near-end speech signal than said second microphone, and said second microphone receives a substantially higher level of said echo signal than said first microphone.

7. The method of claim 5 further comprising the step of positioning said first and second microphones substantially equidistant from said loudspeaker so as to also suppress ambient noise which is substantially equally received by said first and second microphones.

8. The method of claim 1 wherein said audio circuit includes first and second microphones, the echo signal from said loudspeaker to said first and second microphones having acoustic transfer functions $H_1$ and $H_2$, respectively, and wherein the method comprises the steps of:

estimating $H_1$ in a first adaptive filter using said far-end speech signal as a reference signal for adapting the coefficients of said first adaptive filter;

estimating $H_2$ in a second adaptive filter using said far-end speech signal as a reference signal for adapting the coefficients of said second adaptive filter;

filtering the output of said second microphone in a fixed filter which estimates $H_1/H_2$ using the coefficients of said first and second adaptive filters; and subtracting the output of said fixed filter from the output of said first microphone.

9. The method of claim 8 further comprising the step of positioning said first and second microphones relative to said near-end user and said loudspeaker such that said first microphone receives a substantially higher level of said near-end speech signal than said second microphone, and said second microphone receives a substantially higher level of said echo signal than said first microphone.

10. The method of claim 8 further comprising the step of positioning said first and second microphones substantially equidistant from said loudspeaker so as to also suppress ambient noise which is substantially equally received by said first and second microphones.

11. The method of claim 1 wherein said audio circuit includes first and second microphones, the echo signal from said loudspeaker to said first and second microphones having acoustic transfer functions $H_1$ and $H_2$, respectively, and wherein the method comprises the steps of:

estimating $1/H_1$ in a first adaptive filter using said far-end speech signal as a reference signal for adapting the coefficients of said first adaptive filter;

estimating $1/H_2$ in a second adaptive filter using said far-end speech signal as a reference signal for adapting the coefficients of said second adaptive filter;

filtering the output of said first microphone in said first adaptive filter;

filtering the output of said second microphone in said second adaptive filter; and subtracting the output of said second adaptive filter from the output of said first adaptive filter.

12. The method of claim 11 further comprising the step of positioning said first and second microphones relative to said near-end user and said loudspeaker such that said first microphone receives a substantially higher level of said near-end speech signal than said second microphone, and said second microphone receives a substantially higher level of said echo signal than said first microphone.

13. The method of claim 11 further comprising the step of positioning said first and second microphones substantially equidistant from said loudspeaker so as to also suppress ambient noise which is substantially equally received by said first and second microphones.

14. The method of claim 1 wherein said audio circuit includes first and second microphones, the echo signal from said loudspeaker to said first and second microphones having acoustic transfer functions $H_1$ and $H_2$, respectively, and wherein the method comprises the steps of:

estimating $H_1$ in a first adaptive filter using said far-end speech signal as a reference signal for adapting the coefficients of said first adaptive filter;

estimating $1/H_2$ in a second adaptive filter using said far-end speech signal as a reference signal for adapting the coefficients of said second adaptive filter;

filtering the output of said second microphone in said second adaptive filter;

filtering the output of said second adaptive filter in a fixed filter using the coefficients of said first adaptive filter; and subtracting the output of said fixed filter from the output of said first microphone.

15. The method of claim 14 further comprising the step of positioning said first and second microphones relative to said near-end user and said loudspeaker such that said first microphone receives a substantially higher level of said near-end speech signal than said second microphone, and said second microphone receives a substantially higher level of said echo signal than said first microphone.

16. The method of claim 14 further comprising the step of positioning said first and second microphones substantially equidistant from said loudspeaker so as to also suppress ambient noise which is substantially equally received by said first and second microphones.

17. The method of claim 1 wherein said audio circuit includes first and second microphones, the echo signal from said loudspeaker to said first and second microphones having acoustic transfer functions $H_1$ and $H_2$, respectively, and wherein the method comprises the steps of:

estimating $H_1$ in a first adaptive filter using said far-end speech signal as a reference signal for adapting the coefficients of said first adaptive filter;

estimating $H_1/H_2$ in a second adaptive filter using the output of said first adaptive filter as a reference signal for adapting the coefficients of said second adaptive filter;

filtering the output of said second microphone in said second adaptive filter; and subtracting the output of said second adaptive filter from the output of said first microphone.

18. The method of claim 17 further comprising the step of positioning said first and second microphones relative to said user and said loudspeaker such that said first microphone receives a substantially higher level of said near-end speech signal than said second microphone, and said second microphone receives a substantially higher level of said echo signal than said first microphone.

19. The method of claim 17 further comprising the step of positioning said first and second microphones substantially equidistant from said loudspeaker so as to also suppress ambient noise which is substantially equally received by said first and second microphones.

20. The method of claim 1 wherein said audio circuit includes first, second and third microphones, the echo signal from said loudspeaker to said first, second and third microphones having acoustic transfer functions $H_1$, $H_2$ and $H_5$, respectively, and wherein the method comprises the steps of:

estimating $H_1$ in a first adaptive filter using said far-end speech signal as a reference signal for adapting the coefficients of said first adaptive filter;

estimating $H_2$ in a second adaptive filter using said far-end speech signal as a reference signal for adapting the coefficients of said second adaptive filter;

estimating $H_5$ in a third adaptive filter using said far-end speech signal as a reference signal for adapting the coefficients of said third adaptive filter;

filtering the output of said first microphone in a first pair of fixed filters using the coefficients of said second and third adaptive filters, respectively;

filtering the output of said second microphone in a second pair of fixed filters using the coefficients of said first and third adaptive filters, respectively;

filtering the output of said third microphone in a third pair of fixed filters using the coefficients of said first and second adaptive filters, respectively;

multiplying the output of said first pair of fixed filters by a constant (c) in a first multiplier, where $0 \leq c \leq 1$;

multiplying the output of said second pair of fixed filters by a constant (1–c) in a second multiplier; and subtracting the output of said third pair of fixed filters from the outputs of said first and second multipliers.

21. The method of claim 20 wherein the value of (c) is adjusted so as to minimize noise detected by said microphones.

22. The method of claim 20 wherein the value of (c) is adjusted so as to vary the sensitivity of said microphones to said near-end speech signal.

23. The method of claim 1 wherein said audio circuit includes first, second and third microphones, the echo signal from said loudspeaker to said first, second and third microphones having acoustic transfer functions $H_1$, $H_2$ and $H_5$, respectively, and wherein the method comprises the steps of:

estimating $H_1$ in a first adaptive filter using said far-end speech signal as a reference signal for adapting the coefficients of said first adaptive filter;

estimating $H_2$ in a second adaptive filter using said far-end speech signal as a reference signal for adapting the coefficients of said second adaptive filter;

estimating $H_5$ in a third adaptive filter using said far-end speech signal as a reference signal for adapting the coefficients of said third adaptive filter;

filtering the output of said first microphone in a first fixed filter using the coefficients of said second adaptive filter;

filtering the output of said second microphone in a second fixed filter using the coefficients of said first adaptive filter;

multiplying the output of said first fixed filter by a constant (c) in a first multiplier, where $0 \leq c \leq 1$;

multiplying the output of said second fixed filter by a constant (1–c) in a second multiplier;

adding the outputs of said first and second fixed filters in an adder;

filtering the output of said adder in a third fixed filter using the coefficients of said third adaptive filter;

filtering the output of said third microphone in a pair of fixed filters using the coefficients of said first and second adaptive filters, respectively; and subtracting the output of said pair of fixed filters from the output of said third fixed filter.

24. The method of claim 23 wherein the value of (c) is adjusted so as to minimize noise detected by said microphones.

25. The method of claim 23 wherein the value of (c) is adjusted so as to vary the sensitivity of said microphones to said near-end speech signal.

26. The method of claim 1 wherein said audio circuit is part of a hands-free accessory for a wireless telephone.

27. The method of claim 1 wherein said adaptive filters use a Gradient Descent or Least Squares Estimation (LSE) algorithm to estimate said acoustic transfer functions.

28. The method of claim 1 wherein the far-end speech signal is distorted in said loudspeaker and/or in an amplifier or a digital-to-analog converter (DAC) connected to said loudspeaker.

29. The method of claim 1 wherein said adaptive filters are finite impulse response (FIR) filters.

30. A circuit for cancelling an echo signal from an audio source comprising:

a first microphone for detecting said echo signal along a first path defined by a first acoustic transfer function $H_1$;

a second microphone for detecting said echo signal along a second path defined by a second acoustic transfer function $H_2$;

a first adaptive filter for estimating $H_1$;

a second adaptive filter for estimating $H_2$;

a first fixed filter for filtering the output of said first microphone using the estimate of $H_2$;

a second fixed filter for filtering the output of said second microphone using the estimate of $H_1$; and means for subtracting the output of said second fixed filter from the output of said first fixed filter so as to cancel said echo signal.

31. The circuit of claim 30 wherein the coefficients of said first fixed filter are copied from the coefficients of said second adaptive filter, and wherein the coefficients of said second fixed filter are copied from the coefficients of said first adaptive filter.

32. The circuit of claim 30 wherein said first and second microphones are positioned substantially equidistant from said audio source so as to also suppress ambient noise which is substantially equally received by said first and second microphones.

33. The circuit of claim 30 wherein said echo signal is generated from an incoming signal received by said audio source, and wherein said first and second adaptive filters use said incoming signal as a reference signal for estimating $H_1$ and $H_2$, respectively.

34. The circuit of claim 33 wherein said echo signal is a distorted version of said incoming signal.

35. A circuit for cancelling an echo signal from an audio source comprising:

a first microphone for detecting said echo signal along a first path defined by a first acoustic transfer function $H_1$;

a second microphone for detecting said echo signal along a second path defined by a second acoustic transfer function $H_2$;

a first adaptive filter for estimating $H_1$;

a second adaptive filter for estimating $H_2$;

a fixed filter for filtering the output of said second microphone using an acoustic transfer function $H_1/H_2$ based on the estimates of $H_1$ and $H_2$; and means for subtracting the output of said fixed filter from the output of said first microphone so as to cancel said echo signal.

36. The circuit of claim 35 wherein the coefficients of said first and second adaptive filters are copied for use by said fixed filter.

37. The circuit of claim 35 wherein said first and second microphones are positioned substantially equidistant from said audio source so as to also suppress ambient noise which is substantially equally received by said first and second microphones.

38. The circuit of claim 35 wherein said echo signal is generated from an incoming signal received by said audio source, and wherein said first and second adaptive filters use said incoming signal as a reference signal for estimating $H_1$ and $H_2$, respectively.

39. The circuit of claim 38 wherein said echo signal is a distorted version of said incoming signal.

40. A circuit for cancelling an echo signal from an audio source comprising:

a first microphone for detecting said echo signal along a first path defined by a first acoustic transfer function $H_1$;

a second microphone for detecting said echo signal along a second path defined by a second acoustic transfer function $H_2$;

a first adaptive filter for estimating $1/H_1$ and for filtering the output of said first microphone;

a second adaptive filter for estimating $1/H_2$ and for filtering the output of said second microphone; and means for subtracting the output of said second adaptive filter from the output of said first adaptive filter so as to cancel said echo signal.

41. The circuit of claim 40 wherein said first and second microphones are positioned substantially equidistant from said audio source so as to also suppress ambient noise which is substantially equally received by said first and second microphones.

23

42. The circuit of claim 40 wherein said echo signal is generated from an incoming signal received by said audio source, and wherein said first and second adaptive filters use said incoming signal as a reference signal for estimating $1/H_1$ and $1/H_2$, respectively.

43. The circuit of claim 42 wherein said echo signal is a distorted version of said incoming signal.

44. A circuit for cancelling an echo signal from an audio source comprising:

a first microphone for detecting said echo signal along a first path defined by a first acoustic transfer function $H_1$;

a second microphone for detecting said echo signal along a second path defined by a second acoustic transfer function $H_2$;

a first adaptive filter for estimating $H_1$;

a second adaptive filter for estimating $1/H_2$ and for filtering the output of said second microphone;

a fixed filter for filtering the output of said second adaptive filter using the estimate of $H_1$; and means for subtracting the output of said fixed filter from the output of said first microphone so as to cancel said echo signal.

45. The circuit of claim 44 wherein the coefficients of said fixed filter are copied from the coefficients of said first adaptive filter.

46. The circuit of claim 44 wherein said first and second microphones are positioned substantially equidistant from said audio source so as to also suppress ambient noise which is substantially equally received by said first and second microphones.

47. The circuit of claim 44 wherein said echo signal is generated from an incoming signal received by said audio source, and wherein said first and second adaptive filters use said incoming signal as a reference signal for estimating $H_1$ and $1/H_2$, respectively.

48. The circuit of claim 47 wherein said echo signal is a distorted version of said incoming signal.

49. A circuit for cancelling an echo signal from an audio source comprising:

a first microphone for detecting said echo signal along a first path defined by a first acoustic transfer function $H_1$;

a second microphone for detecting said echo signal along a second path defined by a second acoustic transfer function $H_2$;

a first adaptive filter for estimating $H_1$;

a second adaptive filter for estimating $H_1/H_2$ and for filtering the output of said second microphone; and means for subtracting the output of said second adaptive filter from the output of said first microphone so as to cancel said echo signal.

50. The circuit of claim 49 wherein said first and second microphones are positioned substantially equidistant from said audio source so as to also suppress ambient noise which is substantially equally received by said first and second microphones.

51. The circuit of claim 49 wherein said echo signal is generated from an incoming signal received by said audio source, said first adaptive filters uses said incoming signal as a reference signal for estimating $H_1$, and said second adaptive filter uses the output of said first adaptive filter for estimating $H_1/H_2$.

52. The circuit of claim 51 wherein said echo signal is a distorted version of said incoming signal.

24

53. In a speech communications system including a loudspeaker which generates an echo signal from an incoming signal, an echo cancellation circuit comprising:

a plurality of microphones for detecting said echo signal from said loudspeaker;

means for estimating a plurality of acoustic transfer functions using the incoming signal as a reference signal;

means for filtering one or more of the outputs of said microphones using one or more of the estimated acoustic transfer functions; and means for combining the filtered outputs of the microphones so as to cancel said echo signal.

54. The circuit of claim 53 wherein:

said microphones comprise a first, second and third microphones for detecting said echo signal along first, second and third paths, respectively, defined by first, second and third acoustic transfer functions $H_1$, $H_2$ and $H_5$, respectively;

said estimating means comprises first, second and third adaptive filters for estimating $H_1$, $H_2$ and $H_5$, respectively;

said filtering means comprises:

a first pair of fixed filters for filtering the output of said first microphone using the estimates of $H_2$ and $H_5$, respectively;

a second pair of fixed filters for filtering the output of said second microphone using the estimates of $H_1$ and $H_5$, respectively; and a third pair of fixed filters for filtering the output of said third microphone using the estimate of $H_1$ and $H_2$, respectively; and said combining means comprises:

a first multiplier for multiplying the output of said first pair of fixed filters by a constant (c), where $0 \leq c \leq 1$;

a second multiplier for multiplying the output of said second pair of fixed filters by a constant $(1-c)$; and a subtractor for subtracting the output of said third pair of fixed filters from the outputs of said first and second multipliers.

55. The circuit of claim 54 wherein the value of (c) is adjusted so as to minimize noise detected by said microphones.

56. The circuit of claim 54 wherein the value of (c) is adjusted so as to vary the sensitivity of said microphones to a user signal.

57. The circuit of claim 53 wherein:

said microphones comprise a first, second and third microphones for detecting said echo signal along first, second and third paths, respectively, defined by first, second and third acoustic transfer functions $H_1$, $H_2$ and $H_5$, respectively;

said estimating means comprises first, second and third adaptive filters for estimating $H_1$, $H_2$ and $H_5$, respectively; and said filtering means and said combining means comprise:

a first fixed filter for filtering the output of said first microphone using the estimate of $H_2$;

a second fixed filter for filtering the output of said second microphone using the estimate of $H_1$;

a first multiplier for multiplying the output of said first fixed filter by a constant (c), where $0 \leq c \leq 1$;

a second multiplier for multiplying the output of said second fixed filter by a constant $(1-c)$;

an adder for adding the outputs of said first and second multipliers;

a third fixed filter for filtering the output of said adder using the estimate of $H_5$;

a pair of fixed filters for filtering the output of said third microphone using the estimates of $H_1$ and $H_2$, respectively; and a subtractor for subtracting the output of said pair of fixed filters from the output of said third fixed filter.

58. The circuit of claim 57 wherein the value of (c) is adjusted so as to minimize noise detected by said microphones.

59. The circuit of claim 57 wherein the value of (c) is adjusted so as to vary the sensitivity of said microphones to a user signal.

60. The circuit of claim 53 wherein said system comprises a hands-free accessory for a wireless telephone.

61. The circuit of claim 53 wherein said incoming signal is non-linearly distorted in said loudspeaker or in an amplifier or a digital-to-analog converter (DAC) connected to said loudspeaker.

62. The circuit of claim 53 wherein said estimating means comprises a plurality of adaptive filters.

63. The circuit of claim 62 wherein said adaptive filters use a Gradient Descent or Least Squares Estimation (LSE) algorithm to estimate said acoustic transfer functions.

64. The circuit of claim 62 wherein said filtering means comprises a plurality of fixed filters each having coefficients which are copied from one or more of said adaptive filters.

65. The circuit of claim 64 wherein each of said adaptive filters and each of said fixed filters is a finite impulse response (FIR) filter.

66. The circuit of claim 53 wherein said combining means comprises:

means for multiplying one or more of the filtered outputs of said microphones by a corresponding weight function; and means for adding the filtered and/or weighted outputs of said microphones.

67. The circuit of claim 66 wherein each weight function is selected so as to minimize noise detected by said microphones.

68. The circuit of claim 66 wherein each weight function is selected so as to vary the sensitivity of said microphones to a user signal.

* * * * *

UNITED STATES PATENT AND TRADEMARK OFFICE
CERTIFICATE OF CORRECTION

PATENT NO. : 5,796,819
DATED : Aug. 18, 1998
INVENTOR(S) : Eric Douglas Romesburg It is certified that error appears in the above-identified patent and that said Letters Patent is hereby corrected as shown below:

In the drawings, sheet 6, FIG. 7, the label "$L' \cdot H_1 + T \cdot H_4$" should read --$L' \cdot H_1 + \frac{T \cdot H_4 \cdot H_1}{H_2}$--.

In column 2, line 55, change "modem" to --modern--.

In column 12, line 35, change "HR" to --FIR--.

In column 13, lines 32 and 35, change "$H_4$" to --$H_4 \cdot H_1 / H_2$--.

In column 14, line 61, after "each", insert --of--.

Signed and Sealed this

Seventh Day of September, 1999

Attest:

Q. TODD DICKINSON

Attesting Officer

Acting Commissioner of Patents and Trademarks